(12) United States Patent
Matak et al.

(10) Patent No.: US 10,531,137 B1
(45) Date of Patent: Jan. 7, 2020

(54) ATHLETIC TELEMETRY SYSTEM

(71) Applicant: Mayfonk Athletic LLC, Ft. Lauderdale, FL (US)

(72) Inventors: Martin T. Matak, Plantation, FL (US); Jonathan Mitts, Ft. Lauderdale, FL (US); Jef Spaleta, Fairbanks, AK (US); Christoph Roedig, Columbus, OH (US)

(73) Assignee: Mayfonk Athletic LLC, Ft. Lauderdale, FL (US)

( * ) Notice: Subject to any disclaimer, the term of this patent is extended or adjusted under 35 U.S.C. 154(b) by 0 days.

(21) Appl. No.: 15/396,990

(22) Filed: Jan. 3, 2017

Related U.S. Application Data

(60) Provisional application No. 62/274,122, filed on Dec. 31, 2015.

(51) Int. Cl.
| | |
|---|---|
| *G06F 3/00* | (2006.01) |
| *G06F 13/00* | (2006.01) |
| *H04N 5/445* | (2011.01) |
| *H04N 21/237* | (2011.01) |
| *H04N 21/81* | (2011.01) |
| *H04N 21/2665* | (2011.01) |
| *H04N 21/85* | (2011.01) |

(Continued)

(52) U.S. Cl.
CPC ....... *H04N 21/237* (2013.01); *A63B 24/0062* (2013.01); *A63B 71/0619* (2013.01); *A63F 13/211* (2014.09); *A63F 13/212* (2014.09); *A63F 13/25* (2014.09); *A63F 13/355* (2014.09); *G06K 9/00342* (2013.01); *G06K 9/00724* (2013.01); *G06K 9/00751* (2013.01); *G06T 7/20* (2013.01); *G08B 21/0492* (2013.01); *H04N 7/181* (2013.01); *H04N 21/2665* (2013.01); *H04N 21/8133* (2013.01); *H04N 21/8146* (2013.01); *H04N 21/85* (2013.01); *A63B 2024/0068* (2013.01); *A63F 2300/8082* (2013.01)

(58) Field of Classification Search
CPC ............ H04N 21/237; H04N 21/2665; H04N 21/8133; H04N 21/8146; H04N 21/85; H04N 7/181; A63F 13/211; A63F 13/212; A63F 13/25; A63F 2300/105; A63F 13/355; G08B 21/0492; G06T 2207/30221; G06T 7/20; G06K 9/00751; G06K 9/00724; G06K 9/00342; A63B 24/0062; A63B 71/0619
See application file for complete search history.

(56) References Cited

U.S. PATENT DOCUMENTS

| | | | |
|---|---|---|---|
| 6,710,713 B1 * | 3/2004 | Russo ................ | A63B 24/0021 340/573.1 |
| 2010/0162322 A1 * | 6/2010 | Roberts .............. | H04N 5/44543 725/56 |

(Continued)

*Primary Examiner* — Nasser M Goodarzi
*Assistant Examiner* — Patrick A Ryan
(74) *Attorney, Agent, or Firm* — Duane Morris LLP

(57) ABSTRACT

Systems and methods are described for collecting various types of data relating to a sporting event and processing the collected data to improve a broadcast of the sporting event to remote devices. A performance measuring device may be integrated, constructed, weaved or placed, for example, in or on the clothes of athletes that participate in the sporting event. The performance measuring device then monitors real-time motion data and positional information of each athlete within an area associated with the sporting event.

14 Claims, 11 Drawing Sheets

(51) Int. Cl.
     *A63F 13/25*    (2014.01)
     *A63F 13/211*   (2014.01)
     *A63F 13/212*   (2014.01)
     *A63B 24/00*    (2006.01)
     *A63B 71/06*    (2006.01)
     *G06K 9/00*     (2006.01)
     *H04N 7/18*     (2006.01)
     *A63F 13/355*   (2014.01)
     *G08B 21/04*    (2006.01)
     *G06T 7/20*     (2017.01)

(56)            References Cited

U.S. PATENT DOCUMENTS

2011/0145847 A1*  6/2011  Barve .................... H04H 60/64
                                                          725/9
2014/0215508 A1*  7/2014  Wyatt ................ H04N 21/4758
                                                          725/24
2015/0318015 A1*  11/2015 Bose ...................... H04N 7/188
                                                          386/248
2017/0055004 A1*  2/2017  Krietzman ....... H04N 21/21805

* cited by examiner

ATHLETIC TELEMETRY SYSTEM

CROSS-REFERENCE TO RELATED APPLICATIONS

This application claims priority to U.S. Application Ser. No. 62/274,122, filed on Dec. 31, 2015, which is incorporated by reference in its entirety.

This application relates to U.S. application Ser. No. 15/396,907, filed on Jan. 3, 2017, which is incorporated by reference in its entirety and concurrently being filed with this application.

FIELD

The present specification is related generally to wearable devices having sensors for measuring and transmitting information.

BACKGROUND

Conventional athletic wear such as shoes and boots can include technology for measuring and monitoring specific aspects of athletic performance of an individual. For example, pedometers can be incorporated in footwear for measuring a distance that a person walks or runs based upon body motion of the person. In addition, other types of athletic wear can be designed to measure and display specific physiological parameters such as pulse rate, weight, and calorie loss.

SUMMARY

In general, this specification describes systems and methods that are capable of collecting various types of data relating to a sporting event and processing the collected data to improve a broadcast of the sporting event to remote devices. A performance measuring device may be placed on the clothes of athletes that participate in the sporting event. The performance measuring device then monitors real-time motion data and positional information of each athlete within an area associated with the sporting event.

The architecture of the system includes various components that enable real-time transmission of information associated with a sporting event to remote users. For instance, the system includes multiple performance measuring devices that monitor real-time positional information and performance data of athletes that participate in the sporting event. The system also includes a smart device in communication with the performance measuring devices. The smart device aggregates and processes the data collected by the performance measuring devices along with other information associated with the sporting event (e.g., game progression information, historical statistics, etc.). The system also includes remote devices that receive data associated with a broadcast of the sporting event. The smart device adjusts a display of the broadcast on the remote devices.

The smart device utilizes the performance data and positional data of the athletes to perform various functions. In some implementations, the smart device augments a broadcast of a sporting event to include graphical overlays that are associated with an athlete's performance. As an example, if the system detects that a basketball player is moving towards a hoop at a high velocity, then the broadcast of the basketball game can be adjusted to display flame graphics that follow the trail of movement detected for the user. In other implementations, the system enables a producer associated with a basketball game to customize textual information and graphics that are displayed during a broadcast of the sporting event. For example, the producer can use a broadcast configuration interface to display real-time game statistics, advertisements, and graphical overlays that are associated with gameplay.

In general aspect, a computer-implemented method includes the operations of: obtaining data indicating (i) real-time motion data of individuals during a sporting event, (ii) information associated with the sporting event, and (iii) remote devices presently viewing a broadcast associated with the sporting event; processing the real-time motion data in relation to the information associated with the sporting event; determining an occurrence of a milestone during the sporting event based at least on processing the real-time motion data in relation to the information associated with the sporting event; in response to determining the occurrence of the milestone during the sporting event, generating a display configuration that adjusts a display of the broadcast of the sporting event on the remote devices, the display configuration specifying one or more graphical overlays that are provided for output on the broadcast in relation to the occurrence of the milestone, and providing the display configuration for output to the remote devices presently viewing the broadcast of the sporting event.

In some implementations, the real-time motion data includes a measured total acceleration for each of the individuals; and a predicted position for each of the users within an area associated with the sporting event.

In some implementations, generating the display configuration includes: identifying a particular individual from among the individuals that is determined to have a highest measured total acceleration; selecting a graphical overlay to include in the display of the broadcast based on the measured total acceleration; determining a time point to present the graphical overlay; and determining a position of the graphical overlay within the display of the broadcast based on the predicted position of the particular individual within the area associated with the sporting event.

In some implementations, the information associated with the sporting event includes advertisement data related to the sporting event.

In some implementations, the information associated with the sporting event includes historical statistical associated with each of the individuals.

In some implementations, the occurrence of the milestone during the sporting event is based on determining that at least a portion of the real-time motion data, for a particular individual from among the individuals, satisfies a predetermined threshold.

In some implementations, generating the display configuration includes: obtaining, from a producer system, data indicating a user selection of real-time content to be presented on the display of the broadcast; and generating the display configuration based on the obtained data indicating the user selection of real-time content to be presented on the display of the broadcast.

In some implementations, the display of the broadcast of the sporting event is a virtual reality broadcast.

In some implementations, the display of the broadcast of the sporting event is an augmented reality broadcast.

The details of one or more implementations are set forth in the accompanying drawings and the description below.

Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
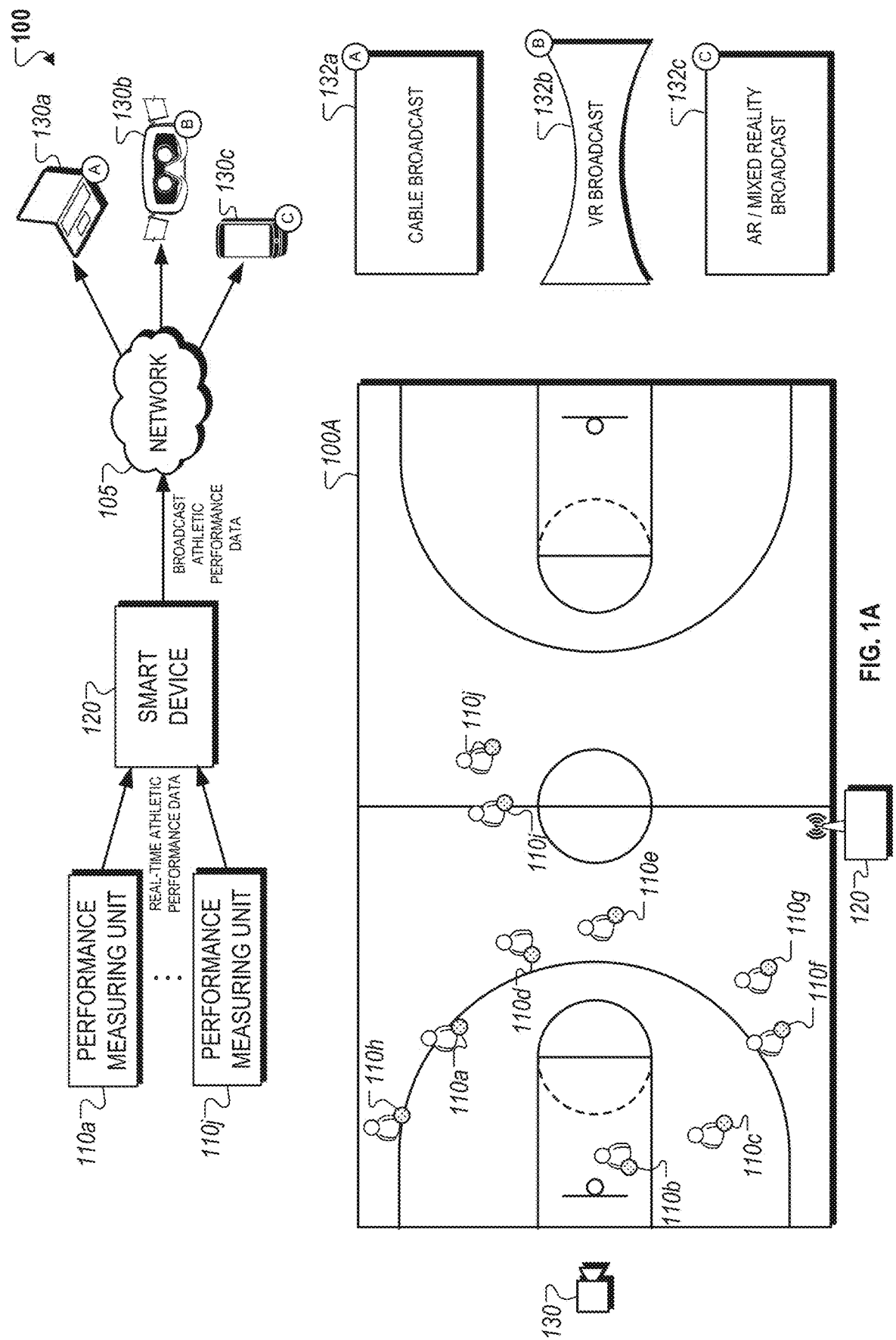
FIGS. 1A-1B are conceptual diagrams that illustrate examples of techniques for broadcasting data associated with a sporting event.

In general, this specification describes systems and methods that are capable of collecting various types of data relating to a sporting event and processing the collected data to improve a broadcast of the sporting event to remote devices. A performance measuring device may be integrated, constructed, weaved or placed, for example, in or on the clothes of athletes that participate in the sporting event. The performance measuring device then monitors real-time motion data and positional information of each athlete within an area associated with the sporting event.

As described throughout, "sensor data" refers to any type of raw data measured and/or collected by sensors associated with a performance measuring device. Examples of sensor data can include accelerometer data, gyroscope data, magnetometer data, or other types of motion, activity, or location-based data.

As described throughout, an "athletic performance parameter" refers to a computed metric that is descriptive of an athlete's physical activity. Example of athletic performance parameters includes "peak acceleration" and "surge," which are discussed in greater detail below.

As described throughout, "peak acceleration" refers to the maximal magnitude of instantaneous acceleration measured during a temporary spike or rapid increase in acceleration above a specified threshold and then returning back below another specified threshold (the thresholds may be identical or not). The value of the peak acceleration is strongly correlated with the amount of exertion and/or stress associated with a physical activity. For example, the greater the measured value of peak acceleration, the higher the amount of physical stress imposed on the individual. In this regard, the measured values of peak accelerations can be used as indicators of physical exertion and stress.

As described throughout, "surge" (or "jerk") refers to the rate of change (derivative) of acceleration with respect to time. For instance, surge measurements can be used in athletic analyses to predict whether particular activities will have either positive or negative implications on the body of an individual. For example, a low surge activity is one where the rate of change in measured acceleration is relatively low, indicating that the activity places low physical stress on the body. Alternatively, a high surge activity is one where the rate of change in measured acceleration is relatively high, indicating that the activity places a high physical stress on the body.

As described throughout, "angle change" (or "cuts") refers to a rapid change in the direction of momentum, whether resulting from self-powered movement, or resulting from impact with another physical object. For instance, acceleration can be measured in component directions (e.g., x-axis, y-axis, and z-axis) and the magnitudes of component accelerations can be monitored to determine changes in angle. Angle change determinations can be used to predict movement and/or analyze how changes in angle impact the measurements of other athletic performance parameters.

As described throughout, a "milestone" refers to any activity of interest that occurs during a sporting event. For example, a milestone in a basketball game can refer to an instance of an explosive dunk by an athlete, or a critical shot taken by an athlete. In another example, a milestone in a football game can refer to a touchdown scored by a team, a field goal scored by a team. The occurrence of a milestone can be automatically determined based on, for example, data collected by the performance measuring devices that are, for example, attached to the articles of clothing of athletes that participate in the sporting event. For example, real-time motion data of one or more athletes can be used to determine if detected activity coincides with a milestone associated with the sporting event. In another example, data collected by the performance measuring devices can be correlated with other types of information (e.g., game progression information) to determine the occurrence of a milestone associated with a sporting event.

As described throughout, "real-time data" refers information that is collected and/or processed with minimal delay after the occurrence of a specified event, condition, or trigger. For instance, "real-time motion data" refers to motion data (e.g., measured acceleration, direction of movement, etc.) that is processed with minimal delay after an athlete performs a physical activity that is sensed by motion sensors (e.g., accelerometers, gyroscopes, magnetometers). The minimal delay in collecting and processing the real-time motion data is based on a sampling rate of the athletic performance device that senses an athlete's physical activity, and a time delay associated with processing collected sensor data. As an example, the athletic performance device may collect 10 samples of sensor data every 100 milliseconds.

As described throughout, "real-time content" refers to electronic content that is related to the occurrence of a milestone during a sporting event that is being broadcasted to viewers. Real-time content is provided for output to the viewers within a maximum time delay after the occurrence of a milestone such that the viewer perceives the milestone to occur when viewing the real-time content. The maximum time delay can be, for example, 100 milliseconds or less, which often represents the time delay for users to perceive simultaneously occurring events. Examples of real-time content include graphical overlays on a broadcast of a sporting event (e.g., flame graphic that follows fast movement), textual information of historic or current athletic performance (e.g., an athlete's points scored during the sporting event), and/or other types of output data that is provided along with a sports broadcast. The real-time content and graphical overlays on broadcast can be associated with specific sponsors of the event highlighting milestones as well as integration with real-time fan input to contribute to which milestone is produced or provided as electronic content for a sporting event.

As described throughout, a "virtual reality broadcast" refers to an electronic broadcast that is provided for viewing on a head-mounted device (HMD) that helps stimulate a user's physical presence within an artificially generated three-dimensional environment. For example, a virtual reality broadcast can include a live or recorded video stream of a sporting event with a 360-degree field of view. When the user wears the HMD, he/she can only view a portion of the field of view (e.g., 110 degrees) of the virtual reality broadcast at any given moment. The portion of the virtual reality broadcast that is displayed to the user can then adjusted based on directions of the user's head movement detected by the head-mounted device. The HMD can either be a mobile device that is placed within a holder device with stereoscopic lens, or a device with an associated display screen that outputs images and/or video provided by an associated computing device.

As described throughout, an "augmented reality broadcast" (or "mixed reality broadcast") refers to an electronic broadcast that includes a live direct or indirect view of a physical, real-world elements whose elements are augmented, supplemented, or replaced by a computer-generated output such as audio, video, graphical data, or textual data. For example, an augmented reality broadcast of a sporting event can be provided to the mobile device of a user that is physically present in an area or location where the sporting event is presently taking place. The display of the mobile device may output an augmented reality broadcast, which presents a live direct view of the sporting event, and displays computer-generated elements based on events or milestones that take place throughout the sporting event. In other examples, an augmented reality broadcast of a sporting event can be provided to the mobile device of a user that is not physically present in the area or location where the sporting event is taking place, but is viewing a broadcast of the sporting event on an electronic device.

In some instances, the mobile device's accelerometer and gyroscope can be used to allow the user to view graphical overlays within a display of the mobile device that move in concert with detected movements of the mobile device. In such instances, the field of view of the mobile device's camera is displayed as background while the graphical overlays are added as the foreground to the background.

As described throughout, "game progression information" refers to data indicating a current live status associated with a sporting event. For example, "game progression information" can identify live game information such as time elapsed for the sporting event, a time remaining for the sporting, live statistical information such as player statistics during the sporting event, team statistics during the sporting event, and information associated with the sporting event such as event location, type of game (e.g., pre-season, post-season), or various types of historical information.

Figure 1B:
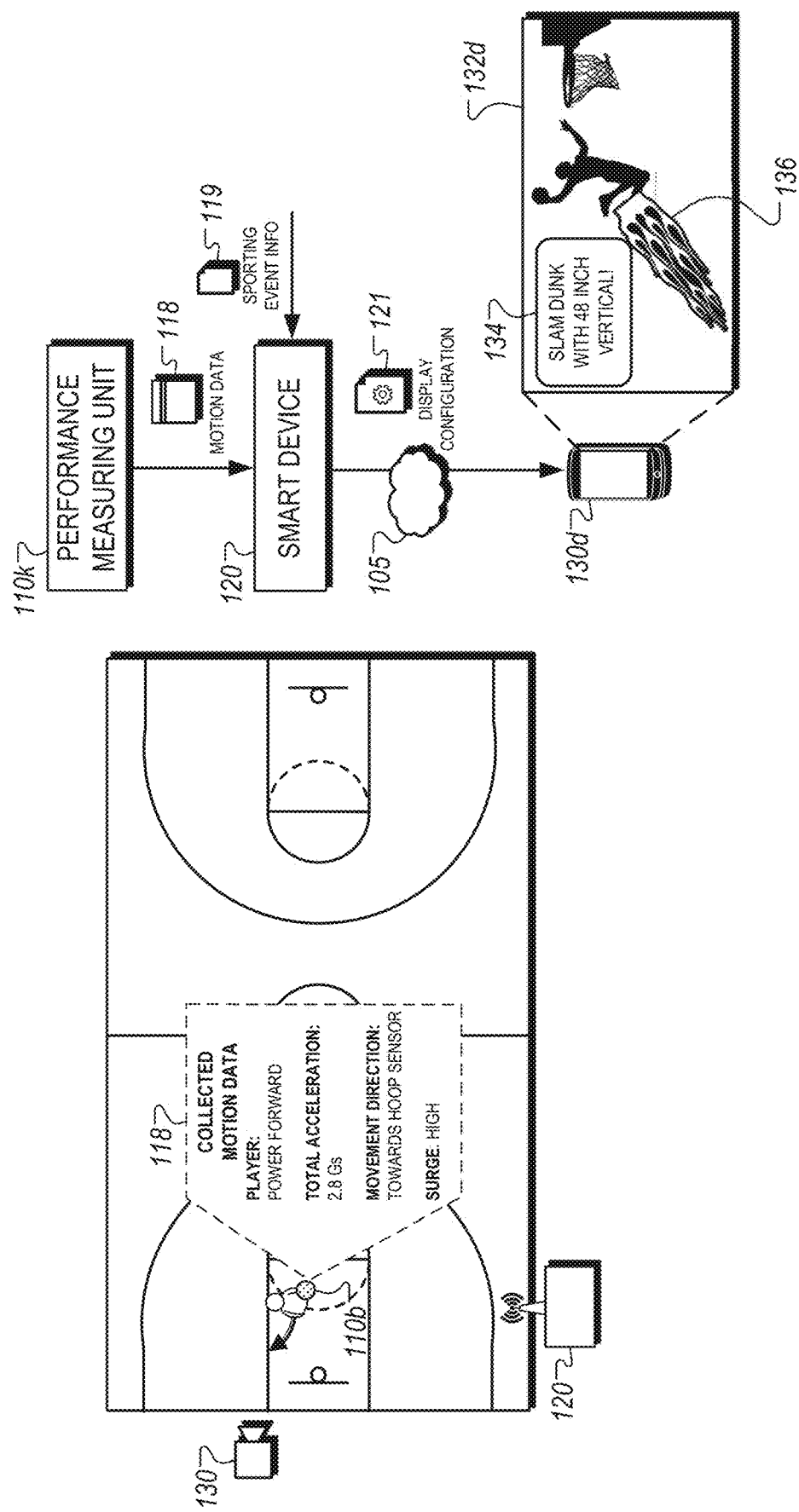

FIGS. 1A-1B are conceptual diagrams that illustrate examples of techniques for broadcasting data associated with a sporting event. Referring initially to FIG. 1A, athletic performance devices 110a-j collect real-time motion data of athletes that participate in a sporting event on a field 100A. A smart device 120 monitors the real-time motion data collected by the performance measuring devices 110a-j. The smart device 120 also generates configuration data that configures and/or adjusts a display of the broadcast of the sporting event on a set of client devices 130a, 130b, and 130c over a network 105 based on the collected real-time motion data.

The smart device 120 can implement the configuration data to configure and/or adjust the display of the broadcast on the set of client devices 130a, 130b, and 130c using different techniques. In some implementations, the smart device 120 only generates the configuration data, but does not adjust the actual broadcast. The actual adjustment and/or configuration of the broadcast is performed by the client devices 130a, 130b, and 130c through the use of a mobile application. In such implementations, the client devices 130a, 130b, and 130c obtain a live broadcast from a third party content provider such as a television broadcasting company, and then locally adjusts the live broadcast based on the obtained configuration data from the smart device 120.

In other implementations, the smart device 120 actually obtains the broadcast of the sporting event, generates configuration data, and adjusts the obtained broadcast based on the configuration data. In such implementations, the client devices 130a, 130b, and 130c obtain an adjusted broadcast through either a webpage or through a mobile application that runs on the client devices 130a, 130b, and 130c.

In other implementations, the smart device 120 initially generates the configuration data, and then transmits the configuration data to a producer system prior to transmitting the configuration data to the client devices 130a, 130b, and 130c. In such implementations, a producer such as a third party content provider or a team manager associated with a sports team that hosts the sporting event may customize the presentation of the broadcast through the use of a configuration interface on the producer system. Input received on the configuration interface can be used to adjust and/or customize the configuration data generated by the smart device 120. The smart device 120 then transmits the adjusted configuration data to the client devices 130a, 130b, and 130c.

In general, each of the performance measuring devices 110a-j can include one or more sensors that are configured to measure real-time motion data that characterizes physical activity associated with an associated athlete. For example, each of the performance measuring devices 110a-j can be associated with an individual athlete in order monitor his/her physical activity and spatial position during the progression of a sporting event. In some implementations, the performance measuring devices 110a-j includes an accelerometer, a gyroscope, a magnetometer, and other associated sensors (e.g., inertial sensors, GPS sensors, ultra-wideband sensors, ultrasonic sensors, infrared sensors, etc.). In other implementations, the performance measuring devices 110a-j only includes an accelerometer. In addition, the performance measuring devices 110a-j can optionally include display units.

The smart device 120 can be any electronic device that is capable of wirelessly exchanging data communications with the performance measuring devices 110a-j in order to obtain collected sensor data, which can include real-time motion data and real-time positional information. The type of device of the smart device 120 and the network architecture of the performance measuring units 110a-j and the smart device 120 may vary for different implementations. For instance, in some implementations, the smart device 120 is a stationary device (such as a server) that exchanges wireless communications with the performance measuring units 110a-j. In such implementations, the smart device 120 may either be a local server (e.g., an on premise server that remains in fixed position within the stadium), or a remote server that is not located within the stadium but is configured to exchange communications over a wide area network (WAN) such as the Internet.

Alternatively, in other implementations, the smart device 120 is a mobile device such as a smart phone, tablet computing device, or a laptop computing device that can function without access to a Wide Area Network (WAN) such as the Internet, but can still provide real-time statistics and other services to the user over a Local Area Network (LAN). As described in more detail in FIG. 3C below, in such implementations, the smart device 120 can be used to temporarily store sensor data collected by the performance measuring devices 110*a-j* during times of limited network connectivity, and subsequently upload the sensor data to a server once network connectivity is re-established.

The network 105 can include one or more of the Internet, a Wide Area Network (WAN), a Local Area Network (LAN), analog or digital wired and wireless telephone networks (e.g., a public switched telephone network (PTSN), Integrated Services Digital Network (ISDN), a cellular network, and Digital Subscriber Line (DSL)), radio, television, cable, satellite, or any other delivery or tunneling mechanism for carrying data.

The network 105 can include multiple networks or subnetworks, each of which can include, for example, a wired or wireless data pathway. The network 105 can include a circuit-switched network, a packet-switched data network, or any other network able to carry electronic communications (e.g., data or voice communications). For example, the network 105 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 105 may include one or more networks that include wireless data channels and wireless voice channels. The network 105 can be a wireless network, a broadband network, or a combination of networks including a wireless network and a broadband network.

In some implementations, the network 105 can include a wireless access point (WAP), which enables the smart device 120 to connect to a wired network connection using Wi-Fi or related standards. In such instances, the network 105 can be used to provide Internet access to the smart device 120 and also provide a network connection with the smart device 120 over a local area network.

Figure 2:
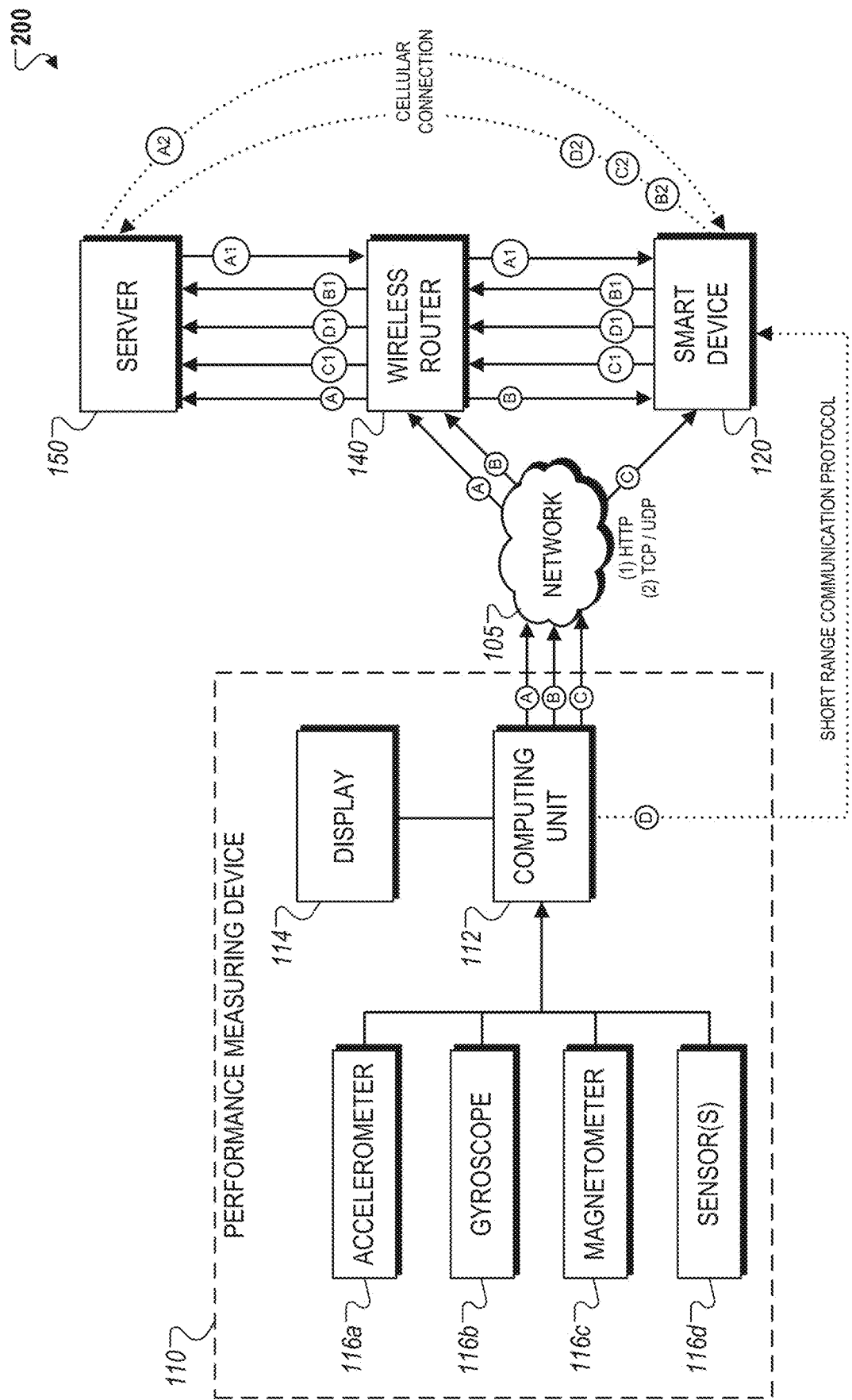
FIG. 2 is a block diagram that illustrates an example of a performance measurement device.
Figure 3A:
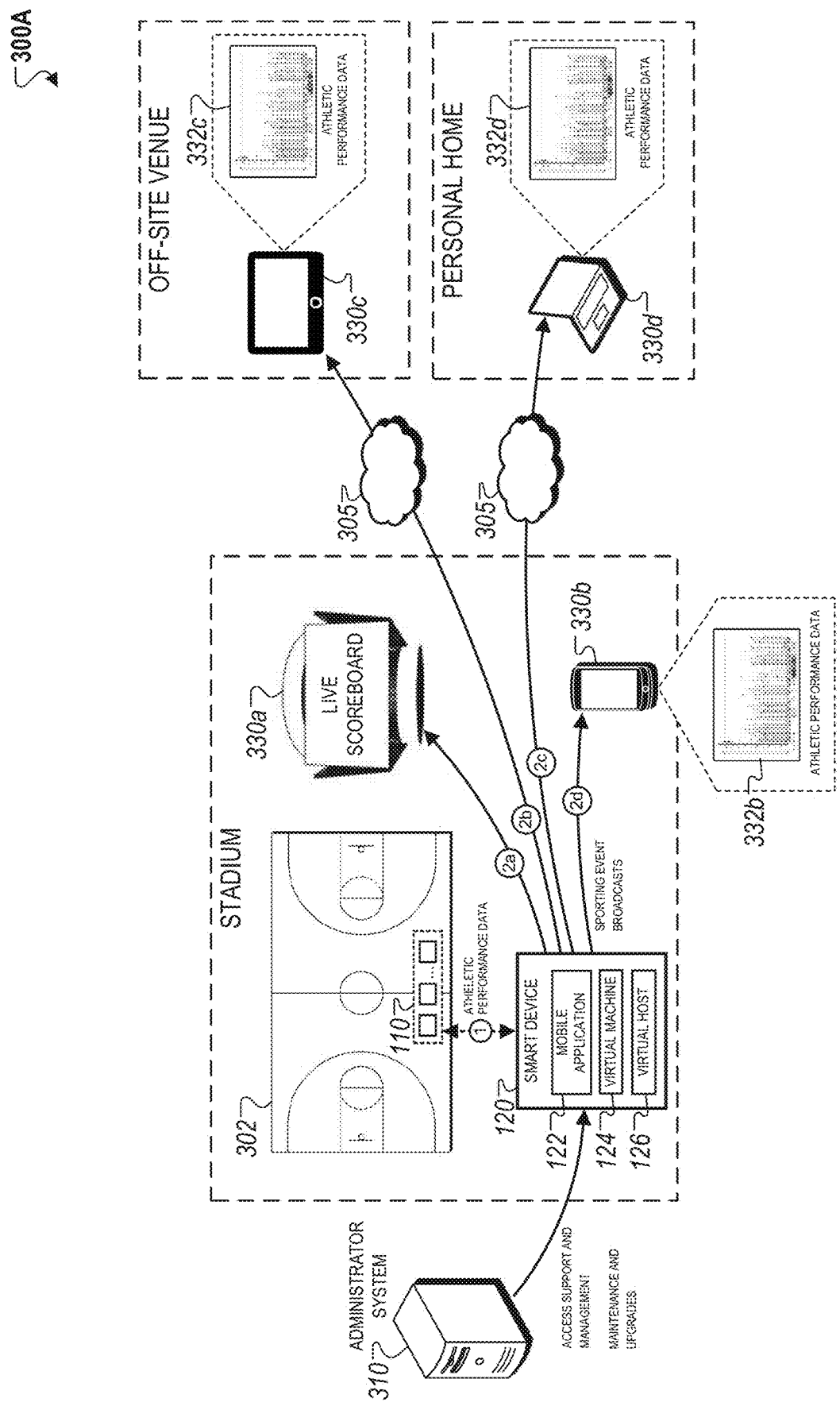
FIGS. 3A-3C are conceptual diagrams that illustrate examples of systems that are capable of remotely broadcasting data associated with a sporting event.
Figure 3B:
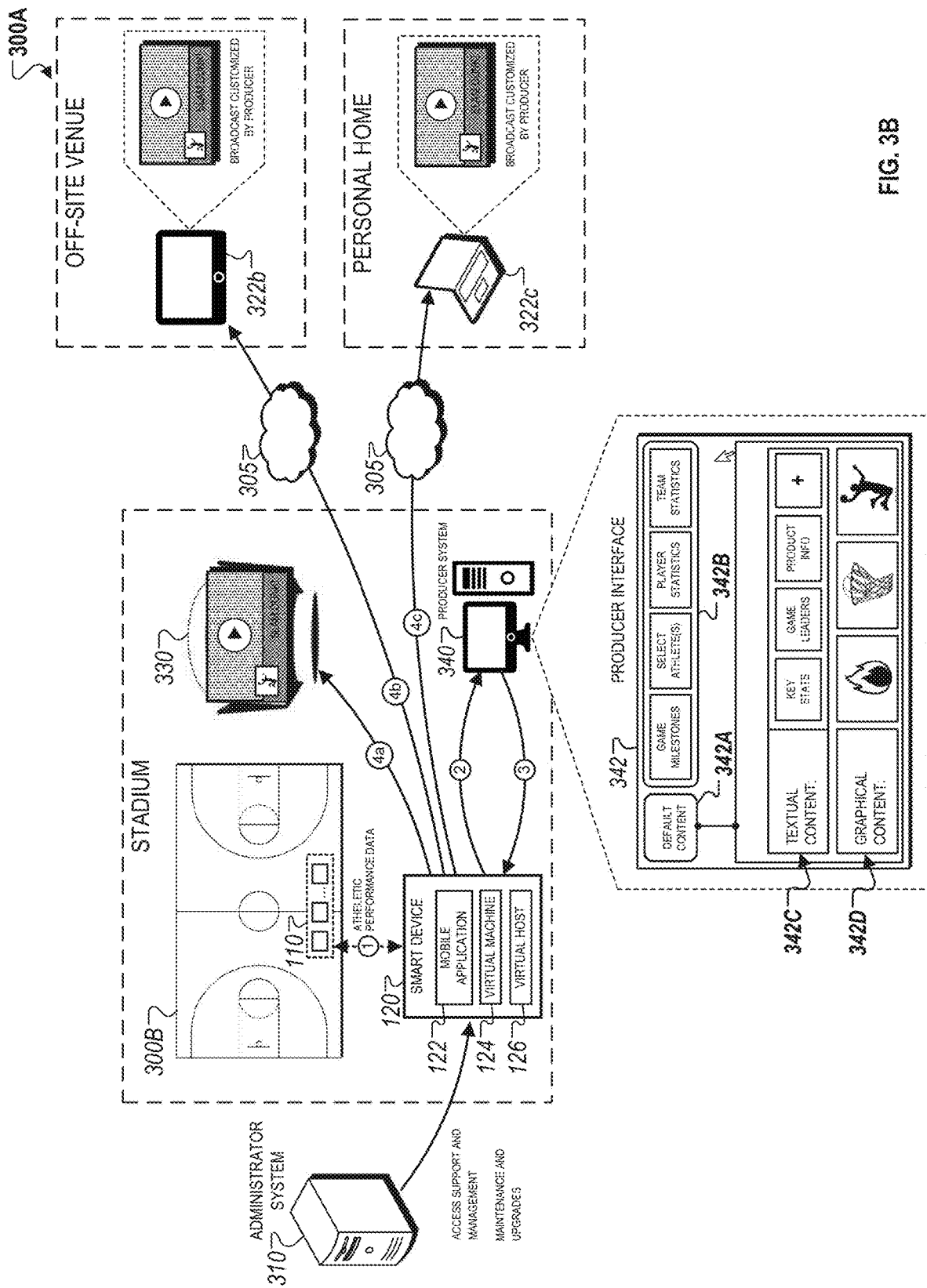

Although FIG. 1A illustrates the performance measuring device 110*a-j* transmitting collected sensor data directly to the smart device 120, in some implementations, the performance measuring devices may transmit the data through the use of other alternative transmission pathways such as those illustrated in FIG. 2. For example, in some implementations, the performance measuring device 110 may transmit data to the smart device 120 through a network access point of a wireless router. In addition, the performance measuring devices 110*a-j* and/or the smart device 120 may also use the network access point to exchange communications with an associated server. The performance measuring device 110 may exchange communications with the server via, for example, HTTP. The performance measuring device 110 may also exchange communications directly with the smart device 120 via, for example, TCP or UDP. Once data is obtained by the server, the athletic performance data can then be remotely broadcasted various remote output devices as illustrated in FIGS. 3A and 3B.

Referring now to the technique illustrated, the smart device 120 can adjust the display of various broadcasting formats. The broadcasting formats can include a cable broadcast 132*a*, a virtual reality broadcast 132*b*, and an augmented reality or a mixed reality broadcast, which are viewed on the client devices 130*a*, 130*b*, and 130*c*, respectively. The broadcast of the sporting event is captured by a video camera 130. The broadcast can also be collected and/or provided by different devices/entities. In some implementations, a third entity such as a broadcast television provider supplies a broadcast to the smart device 120, which can then either adjust the broadcast data or provide an instruction to adjust the broadcast data on a client device. Alternatively, in order implementations, the smart device 120 itself may capture the broadcast, and then adjust and/or transmit configuration data to adjust the captured broadcast as described above. In this regard, the smart device 120 processes both broadcast data and configuration data used to adjust the underlying broadcast data.

In the example depicted in FIG. 1A, the sporting event is a basketball game, and the broadcast refers to live video footage that is viewable over the network 105. The broadcast can be, for example, a live video stream that is made available to views associated with client devices 130*a*, 130*b*, and 130*c* by content providers associated with the sporting event (e.g., a broadcast network, or a third-party streaming service). Users of the client devices 130*a*, 130*b*, and 130*c* may view a live broadcast of the sporting event through a webpage, a mobile application, or through a cable television service. In other examples, the sporting event can also be a football game, a hockey game, a tennis game, or any other type of sporting event that is broadcast to the public.

The performance measuring devices 110*a-j* are initially placed on or near the athletes that participate in the sporting event. For example, in some implementations, the performance measuring devices 110*a-j* are integrated or placed in or on articles of clothing (e.g., uniforms) that are worn by the athletes. In other implementations, the performance measuring devices 110*a-j* are placed directly onto physical body parts of the athletes (e.g., arms, legs) using compression clothing or other articles of clothing, flexible fabric integrating measuring devices or specific adhesives to attach the performance measuring devices to the athletes during physical activity.

The performance measuring devices 110*a-j* measure various types of real-time motion data that characterize physical activities performed by each individual athlete that participates in the sporting event on the area 100A. For instance, as described in more detail in FIG. 2, the performance measuring devices 110*a-j* can each include an accelerometer, a gyroscope, and a magnetometer, that measure acceleration, rotational speed, and magnetic field strength and direction, respectively. More particular descriptions relating to collection and processing of the raw sensor data by the performance measuring devices 110*a-j* are provided below with respect to FIG. 2.

The performance measuring devices 110*a-j* also monitor positional information of each athlete on the area 100A. For example, using the multi-lateration techniques illustrated in FIGS. 5A-5B and described in more detail below, each performance measuring device determines (i) a position of an associated athlete relative to other nearby performance measuring devices, and (ii) a position of the associated athlete relative to a fixed reference point (or multiple points) such as a corner of the area 100A. The positional information and motion data for each athlete collected by a corresponding performance measuring device are then transmitted to the smart device 120.

The smart device 120 processes sensor data obtained from the performance measuring devices 110*a-j* to generate a display configuration that configures or adjusts a display of a broadcast for the sporting event. In some implementations, the display configuration enables the display of graphical overlays onto an existing broadcast of the sporting event. The display configuration provides various specifications such as a screen location to display a graphical overlay, a time point during the broadcast to display the graphical overlay, and the information/graphics to include in the graphical overlay.

For example, as illustrated in FIG. 1B, the display configuration can specify the display of a flame graphic collected sensor data for a particular athlete indicates that he/she is performing a slam dunk during a basketball game. In another example, the display configuration can correlate positional information of athletes in relation to a field of view of the area 100 of a broadcast such that when a user provides a user input on a particular location of a screen that displays the broadcast, athletic performance information for an athlete associated with the particular location of the screen is provided for output to the user. In both of these examples, the display configuration enables the display of the graphical overlays is performed in real-time during a live broadcast of the sporting event. The graphical overlays indicating particular athletic displays such as a slam dunk with flame graphic can include pre-determined or community influenced advertisements and product integration, for example, "Lebron James performs a slam dunk with a flame graphic sponsored by new Doritos Hot Chips". In that example, the sponsor was selected from a pool of participating paid sponsors and selected via social or content viewing community by poll voting or quantity based influencers known as "likes" or "props".

After generating the display configuration, the smart device 120 transmits the display configuration to various client devices such as the devices 130a, 130b, and 130c over the network 105. As described above, the display configuration configures a display of a broadcast of the sporting event based on sensor data collected by the performance measuring devices 110a-j. For example, the display configuration can cause the output of graphical overlays that are related to detected milestones associated with the sporting event (e.g., a slam dunk by a basketball player, a touchdown by a football player, a goal scored by a soccer player, etc.).

The display configuration can be used to configure different broadcast formats on client devices. In the example illustrated in the figure, the device 130a outputs the cable broadcast 132a, the device 130b outputs the virtual reality broadcast 132b, and the device 130c outputs the augmented reality or mixed reality broadcast 132c. For instance, a display configuration for the cablecast broadcast 132a may specify output of graphical overlays that are displayed on top of a channel broadcast of a sporting event for a television set. In contrast, a display configuration for the virtual reality broadcast 132b may specify output of graphical overlays that are displayed on top of a broadcast based on head movements of a user using the headset 130b. In another example, a display configuration for the augmented reality broadcast 132c may specify output of computer-generated graphical overlays near specified physical real-world objects that are within a field-of-view of a camera of the device 130c.

The descriptions above relate to processing collected sensor data in real-time in relation to a live broadcast of a sporting event (e.g., processing the collected sensor data with minimal delay to the occurrence of actual events or milestones that are detected during the live broadcast). In some implementations, the system 100 may instead provide a delayed broadcast to the devices 130a, 130b, and 130c.

The system 100 may introduce a brief delay (e.g., one to ten seconds) compared to the live broadcast of the sporting event. During the delay, the system 100 processes sensor data collected by the athletic performance devices 110a-j to determine if a milestone has taken place. In response to determining the occurrence of a milestone, the system 100 can then generate and process a display configuration with higher fidelity relative to display configuration generated for a live broadcast during the brief delay.

In the implementations where the system 100 provides a delayed broadcast, the system 100 is capable of using information from the live broadcast that follows the occurrence of a detected milestone to improve the timing and placement of graphical overlays in relation to the corresponding milestone within the delayed broadcast. For example, if an athlete performs an action that subsequently results in being designated as a foul move in the live broadcast, then the graphical overlay presented in the delayed broadcast can be adjusted relative to the graphical overlay presented in the live broadcast (which is generated without a determination that the performed action is designated as a foul move). In addition, in some implementations, a user that views the broadcast of the sporting event may be able to select the type of broadcast (e.g., live broadcast, delayed broadcast) to view. For example, a user may select an option to view a live broadcast with lower fidelity graphical overlays, or another option to view a delayed broadcast with more accurate, higher fidelity graphical overlays.

FIG. 1B illustrates an example of a technique used by the smart device 120 to dynamically adapt a broadcast 132d of a sporting event on a client device 130d. In general, the smart device 120 initially identifies the occurrence of a milestone during the sporting event based on real-time motion data 118 collected by a performance measuring device 110b. In response, the smart device 120 generates a display configuration 121 based on the real-time motion data 118 and information 119 associated with the sporting event. The display configuration 121 is then transmitted to the client device 130d, which then causes a live display of graphical overlays 134 and 136 on the broadcast 132d.

In the example depicted in the figure, the performance measuring device 110k collects real-time motion data 118 of an athlete as he runs towards the basket. As shown, the real-time motion data 118 includes an identification of the particular athlete associated with the performance measuring device 110k (e.g., "SCOTT JOHNSON"), and various athletic performance parameters such as a measured total acceleration (e.g., 2.8 Gs), a direction of movement (e.g., "TOWARDS HOOP SENSOR"), a measured surge, and a jump height (e.g., "48 IN."). In this example, the total acceleration, the movement direction, the surge, and the jump height are all computed based on fusing sensor data collected by an accelerometer, a gyroscope, and a magnetometer of the performance measuring device 110k. In particular, the surge is computed based on measuring the change in total acceleration over a particular period of time, and the jump height is measured based on a displacement of the athletic performance device 110k (which can be measured based on a known velocity of the athlete and the direction of movement).

In some implementations, the athletic performance parameters included within the real-time motion data 118 is computed locally by the performance measuring device 110k and transmitted to the smart device 120. Alternatively, in other implementations, the athletic performance parameters are instead computed by the smart device 120 based on raw sensor data collected by the accelerometer, the gyroscope, and the magnetometer of the performance measuring device 110k. In such implementations, the smart device 120 may post-process the raw sensor data to reduce sensor detection errors. These measurements may optionally be supplemented by, or fused with, the multi-lateration techniques described in FIGS. 5A and 5B.

The performance measuring device 110k and/or the smart device 120 determines the occurrence of a milestone based on comparing attributes of the real-time motion data 118 to a set of predetermined attributes associated with milestone actions of the sporting event. For instance, a milestone representing a dunk performed by a basketball player can be associated with a threshold total acceleration, a direction of movement towards a basketball hoop, and a threshold vertical movement by the athlete. In the example illustrated in FIG. 1B, an occurrence of a slam dunk is determined based on the measured total acceleration satisfying the threshold acceleration for a dunking action, movement indicated as being towards a basketball hoop, and a jump height that also satisfies a threshold height for a dunking action. In this regard, the real-time motion data 118 can be used to infer and/or predict that an athlete is about to perform, or is in the process of performing, a dunk action. During or in replay, a sponsor (or community generated sponsor) can be integrated in the graphic overlay.

In response to detecting the occurrence of the milestone, the smart device 120 obtains information 119 associated with the sporting event. Such information can include, for example, game progression information (e.g., the current status of the sporting event), historical or in-game statistics (e.g., individual athlete statistics or team statistics), advertisement information associated with the milestone action (e.g., sponsor information for the athlete detected to be performing the milestone action), among other types of information. Advertisers as well as the milestone content can be community generated or pre-determined by the network or event coordinator for social engagement. Fantasy sport applications can be integrated in real-time on third party applications and systems as well as be the source of the community based actions for sponsors, advertisers or specific milestone visuals. This obtained information can either be provided for output as a graphical overlay on the broadcast to enhance a user's experience while watching the broadcast, or used to adjust the identification of the milestone action. In the first instance, obtained information can be provided for output to the user to enhance the display of information or graphics on a broadcast being viewed by a user. In the example instance, obtained information can be used to reduce false positive occurrences of milestone actions that are detected based solely on the real-time motion data 118. For example, obtained game progression data indicating that a basketball game has recently started can be used to reduce the likelihood of falsely detecting a jump-off at the start of the game as a dunk milestone since both activities involve jumping motions.

The smart device 120 then generates the display configuration 121, which configures the display of the broadcast on the client device 130d as described above. In some instances, such as the example illustrated in FIG. 1B, the display configuration 121 specifies the output of graphical overlays that are associated with the detected milestone action. As illustrated, the display configuration 121 specifies the output of a graphic 136 that trails the athlete as he/she performs a dunk motion, and the output of a notification 134 that provides a user with textual descriptions of the dunk motion based on the measured jump height within the real-time motion data 118. In other instances, the display configuration can automatically adjust other aspects of the broadcast in real-time. For example, if a broadcast has multiple video feeds that are simultaneously collected, the display configuration may specify a selection of a particular video feed that best visualizes the milestone action, and then designate the output of the particular video feed as the broadcast as the athlete performs the milestone action. In other examples, the smart device 120 transmits the display configuration 121 to a provider system, which allows a provider to adjust the presentation of the broadcast by adjusting or customizing the display configuration 121 that was automatically generated by the smart device 120. In such implementations, the content provider may manually specify the best video feed from among multiple video feeds of the sporting event to broadcast as athlete performs the milestone action.

In some implementations, game progression information, as described above, can be used to select and/or adjust the graphical overlays that are specified by the display configuration 121. For example, if the game progression information indicates that a sporting event is in overtime, then special graphical overlays can be used to represent milestones (e.g., dunking actions) that are more impressive and different than those graphical overlays that are typically used for the same milestones when the game is not in overtime. In this example, the smart device 120 dynamically adjusts the visual attributes of graphical overlays specified by the display configuration 121 based on an identified context indicated by the game progression information.

In some implementations, historical statistics of athletes can be used to select and/or adjust the graphical overlays that are specified by the display configuration 121. For example, a different graphic may be used for a jump or a movement to indicate that the jump is higher or the movement acceleration is more than in the last, for example, two games or more than in his career to date. Other examples are the integration of graphical overlays and data integration with internal and external systems for use in "Fantasy gaming" applications.

FIG. 2 is a block diagram that illustrates an example of a system 200 that is capable of transmitting athletic performance data. The system 200 can include an athletic performance unit 110, a smart device 120, a wireless router 140, and a server 150. The performance measuring device 110 further includes an accelerometer 116a, a gyroscope 116b, a magnetometer 116c, sensors 116d, a computing unit 112, and a display 114. In some implementations, the performance measuring device 110 may include less than all of the sensors or components depicted in FIG. 2. For example, in some implementations, the performance measuring device 110 only includes an accelerometer 116a. In addition, in some implementations, the display 114 is an optional component of the performance measuring device 110.

In general, the architecture of the system 200 enables the transmission of athletic performance data collected by the performance measuring device 110 (e.g., measured acceleration) to either the smart device 120 and/or the server 150. As illustrated, the system 200 enables various alternative transmission pathways for the collected data based on the configuration of the system and the wireless communication protocol used to transmit the collected data.

The performance measuring device 110 generally transmits collected sensor data to the smart device 120 and/or the server 150 using various alternative transmission pathways. The transmission pathways vary based on the type of communication protocol used to transmit the collected sensor data and the sequence of components used to transmit the collected sensor data to the server 150. Once the collected sensor data is transmitted to the server 150, the system 200 can broadcast the athletic performance data to remote devices.

In the figure, alternative transmission pathways are represented by letters, "A," "B," "C," and "D." In addition, alternative sub-pathways are represented by numbers following letters for alternative pathways (e.g., "C1" and "C2" represent alternative sub-pathways for the transmission pathway represented by the letter "C").

In the transmission pathway represented by "A," the performance measuring device 110 transmits the collected sensor data to the server 150 through the wireless router 140 without routing the collected data through the smart device 120. In this transmission pathway, because the smart device 120 does not initially obtain the collected sensor data, the server 150 transmits the obtained sensor data either through the wireless router 140 (e.g., sub-pathway "A1") or through a cellular connection (e.g., sub-pathway "A2").

In the second transmission pathway represented by "B," the performance measuring device 110 transmits the collected sensor data to the smart device 120 through the wireless router 140 (e.g., using TCP or UDP), and then the smart device 120 relays the obtained data to the server 150. For example, the smart device 120 can transmit the obtained data to the server 150 through the wireless router 140 (e.g., sub-pathway "B1") or through a cellular connection (e.g., sub-pathway "B2").

In the third transmission pathway represented by "C," the performance measuring device 110 transmits the collected sensor data to the smart device 120 directly to the smart device 120 (e.g., using TCP or UDP over WiFi Direct), and then the smart device 120 relays the obtained data to the server 150. For example, the smart device 120 can transmit the obtained data to the server 150 through the wireless router 140 (e.g., sub-pathway "C1") or through a cellular connection (e.g., sub-pathway "C2"). In this transmission pathway, the wireless router 140 is not needed to transmit the collected sensor data from the computing unit 112 to the smart device 120.

In the fourth transmission pathway represented by "D," the performance measuring device 110 transmits the collected sensor data to the smart device 120 directly to the smart device using a short-range communication protocol (e.g., Bluetooth, NFC, IR, etc.) that does not require network connectivity. The smart device 120 then relays the obtained data to the server 150. For example, the smart device 120 can transmit the obtained data to the server 150 through the wireless router 140 (e.g., sub-pathway "D1") or through a cellular connection (e.g., sub-pathway "D2").

As described above, the performance measuring device 110 can be integrated within or placed on one or more articles of clothing such as shoes, gloves, wrist bands, belts, straps, hats, shorts, caps, shirts, sports bras, underwear, helmets, pads, pants, compression sleeves, compression socks and half socks, shoulder pads, protective pads or other similar types of clothing.

The performance measurement unit 110 includes a computing unit 112 that can communicate over an interface with sensor units such as the accelerometer 116a, the gyroscope 116b, the magnetometer 116c, and the one or more sensors 116d. The computing unit 112 can be a controller, a microcontroller, or any other type of processor. The computing device 112 can include short-term memory and/or long-term persistent (non-volatile) storage for temporarily storing data exchanged with the sensor units, and/or storing computer-implemented instructions that control the operations of the sensor units. In some implementations, the computing unit 112 additionally includes an antenna that transmits some form of electromagnetic radiation to devices that are electrically or communicatively coupled to the performance measurement unit 110.

The computing unit 112 exchanges performance data with the accelerometer 116a, the gyroscope 116b, the magnetometer 116c, and the one or more sensors 116d. For example, the computing unit 112 may exchange data transmissions using an interface that can include, for example, a serial, parallel, Bluetooth, USB, or other types of generic bus that are capable of transmitting information collected by the accelerometer 116a, the gyroscope 116b, the magnetometer 116c, and the one or more sensors 116d. Although not depicted in FIG. 1A, the computing unit 112 can exchange performance data with other types of sensor units such as an ultra-wideband transceiver, an ultrasonic sensor, an infrared sensor, a global positioning system (GPS), a pressure sensor, a piezo element, and/or optical light sensors.

The accelerometer 116a, the gyroscope 116b, the magnetometer 116c, and the one or more sensors 116d can be used to measure one or more athletic performance parameters. For example, the one or more athletic performance parameters can include, but are not limited to, acceleration, jerk (the derivative of acceleration, also known as surge), cadence, distance, GPS location, vertical leap, vertical touch height, heart rate, pace, pressure, power, stress, kinetic energy, contact, speed, swing plane, and/or ambient body temperature.

Once the accelerometer 116a, the gyroscope 116b, the magnetometer 116c, and the one or more sensors 116d measure one or more athletic performance parameters, the measured athletic performance parameters can be transmitted to the computing device 112. The computing device 112 can process the performance data in real-time to obtain a set of desired athletic performance data. For example, the computing device 112 can obtain performance data such as a maximum jump height, a maximum vertical touch height, an average jump height for a particular individual, and/or the number of jumps made by a particular individual within a predetermined time interval. In addition, the computing device 112 can be configured to provide period data for particular time intervals. The performance data can then be transferred to the smart device 120 over the network 105.

The performance measurement unit 110 also includes a display unit 114 that provides an output of the performance data measured by the accelerometer 116a, the gyroscope 116b, the magnetometer 116c, and the one or more sensors 116d, and processed by the computing unit 112. For instance, the display unit 114 can provide outputs of the values associated with the one or more athletic parameters, visualizations indicative of athletic trends indicated by the one or more parameters over a period of time, or other types of related information associated with the measured performance data. In other implementations, the performance measurement unit 110 does not include a display unit 114. In these implementations, visualization of data may be provided via an external display unit communicatively coupled to the performance measurement unit 110 through, for example, network 105. The external display unit may, for example, be integrated into the smart device 120.

The smart device 120 can be any type of electronic computing device with network connectivity. For example, the smart device 120 can be a smart phone, a tablet computing device, a smart watch, smart apparel, smart glasses, smart lenses, a laptop computing device, a desktop computing device. For instance, the athletic performance data measured by the performance measuring device 110 can be transmitted to a personal computer of an athlete to track individual training progress, and/or provide information related to performance improvements. Alternatively, in other instances, the smart device 120 can be a non-personal computing device such as a web server or a network computer. For example, athletic performance data during a sporting event can be detected by the athletic performance unit 110 and transmitted to a server in order to display the measured athletic performance data on a television broadcast of the sporting event.

Data collected by the sensors includes acceleration data, gyroscope data, and magnetometer data. Acceleration data includes a measured horizontal and/or a measured vertical acceleration, for instance, measured in terms of gravitational force (g-forces), associated with an individual's movement over a particular period of time. For instance, the magnitude of measured acceleration can be used to indicate an intensity or an impact associated with a particular physical action by the individual. In this regard, measurement of acceleration can be used to quantify force exerted by an individual, the energy exerted during a movement, the power generated during a movement, and/or potential physical impacts.

The acceleration data can be used for a variety of performance monitoring purposes. In one example, the acceleration and impact data can be used for real-time automotive analysis for injury prevention. In this example, the magnitude of acceleration can be used to determine the amount of force exerted by an individual and predict a risk of injury based on the amount of force exerted during a particular physical activity. In another example, acceleration data can be used with existing devices such as a head and neck support (HANS) device to assist drivers and/or medical personnel in making decisions during an accident. In this example, the magnitude of impact can be used to predict actions that should be taken to prevent additional injury and/or provide treatment for existing injuries. In another example, acceleration data can be used to determine when an individual has fallen and/or predict the likelihood of a fall.

In other instances, the acceleration data can be used to provide quantitative assessments of actions taken by athletes during a sporting event. For example, an acceleration measurement can be used to determine an intensity associated with actions taken by an athlete during a sporting event. This can include intensity measurements made when a runner pushes off the starting block during track and field races, or when a curler delivers a rock. In other example, acceleration measurement can be used to determine an impact with surrounding physical objects. This can include impact measurements that indicate a water surface impact when a diver comes into contact with water during a dive. It can also include an example of the intensity a basketball player has when jump or making cuts. Other instances can include utilizing impact measurements to determine efficiency of actions taken.

In other instances, the acceleration data can be used to provide visualizations and/or other graphical displays associated with an individual's movement. For example, acceleration measurement can be used to depict real-time speed of objects that come into contact with appendages. In this example, visible indicators can be superimposed on action replays to depict magnitudes of speed to enhance user experience. The visualizations may be presented on a display of the smart device 120, the display 114 of the performance unit 110, and/or an external display distinct from but communicatively coupled to the performance unit 110 and/or the smart device 120 over the network 105.

Examples of acceleration measurements can include peak accelerations, surge, and angle change. Although these examples are described in detail below, other types of measurements can be possible.

The hundreds or thousands of such peak accelerations that occur over a typical workout or athletic performance can also be used to determine the amount of physical exertion and stress. For example, many large magnitude peak accelerations occurring over a sufficiently long time may indicate that an individual may have exerted physical force for a sustained period of time, increasing the risk of injury. In such instances, peak accelerations can be depicted graphically on a line graph as a function of time or a histogram graph to indicate the frequency of force exertions at various magnitudes. In each of these examples, a set of statistical values such as counts, averages, or sums may be determined based on peak acceleration data in order to make determinations related to physical exertion and stress.

In some instances, surge measurements can be used in athletic training exercises to determine the effectiveness of an individual's technique. For example, self-powered high surge events which can be referred to as "positive" high surge events (e.g., a basketball dunk, a race start, etc.), can be monitored to determine how effective an individual is at generating rapid acceleration increases on demand. In this regard, surge measurements can be used to set training goals for individuals based on correlating other types of athletic performance parameters (e.g., vertical height) with physical impact on human body. Another example can be a "negative" high surge event in which an athlete is performing a high surge event such as landing and does so with an inappropriate movement indicating a high surge measurement with a "negative high surge classification (the athlete landed poorly causing a negative high surge or stress surge).

In some instances, surge measurements can be used to classify certain types of physical activities within a training regimen based on distinguishing between high surge and low surge activities. For example, low surge activities can be included within a training regimen when an individual is recovering from surgery and/or has experienced an injury that makes him/her susceptible to physical injury. In addition, surge measurements can also be used to evaluate whether the individual's athletic ability is recovering in line with the individual's physical condition.

In some implementations, the performance measuring device 110 may be the performance measuring device disclosed in application Ser. No. 15/396,907, titled "ATHLETIC PERFORMANCE ESTIMATION TECHNIQUES" that is being concurrently filed with this application. In such implementations, the performance measuring device 110 may detect events through use of the techniques disclosed in that application. The contents of that application are incorporated by reference into this application in its entirety.

Figure 3C:
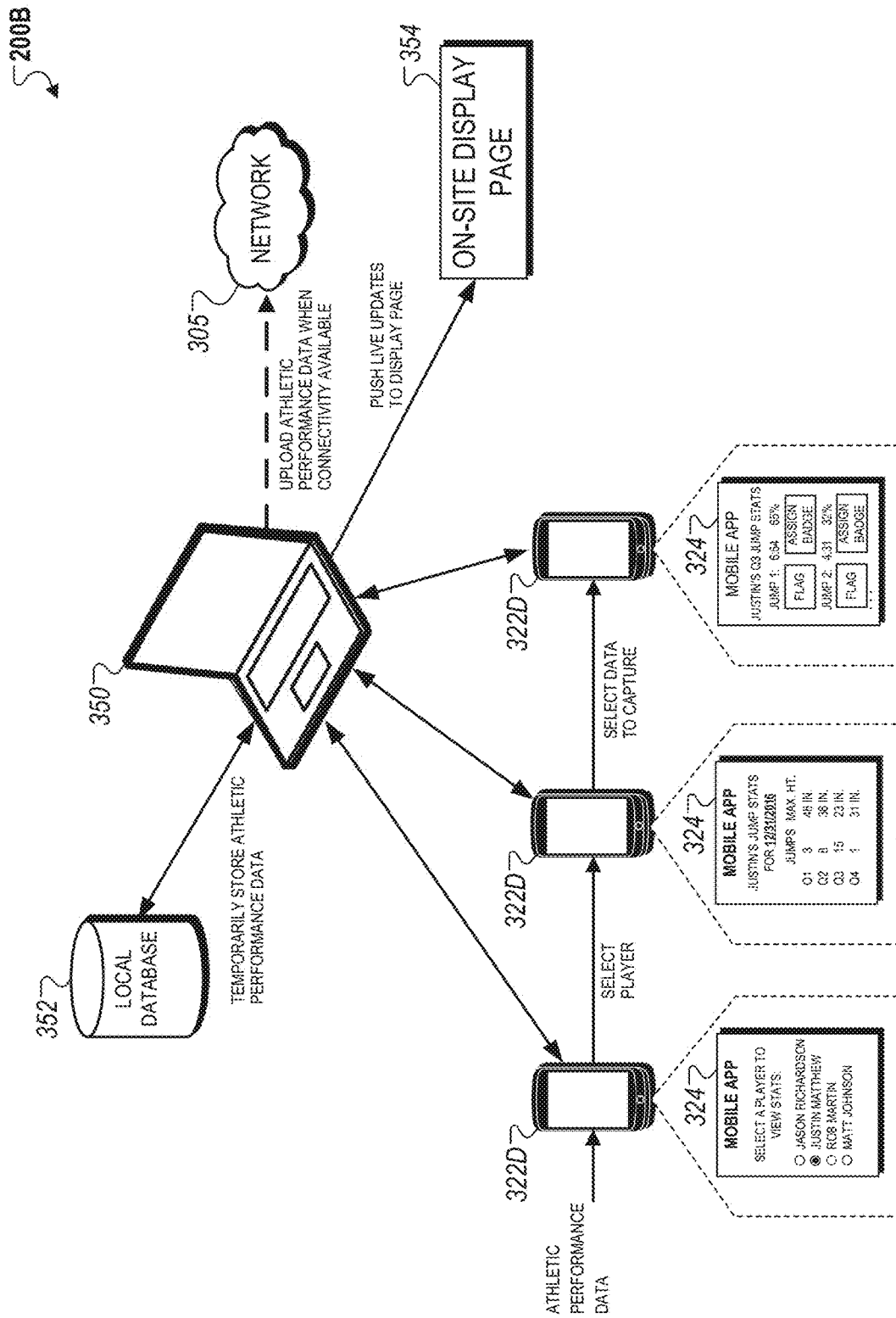

FIGS. 3A-3C are block diagrams that illustrate examples of systems 300A, 300B, and 300C, respectively, for remotely broadcasting performance data. Referring initially to FIG. 3A, the system 300A generally includes an administrator system 310, one or more performance measuring devices 110, the smart device 120, and multiple output devices that display a broadcast of a sporting event taking place in an area 302. The output devices include devices located inside a stadium of the sporting event such as a scoreboard 330a and a local device 330b, and remote devices that receive a broadcast of the sporting event over a network 305 such as devices 330c and 330d.

The system 300A is capable of providing broadcasts to three general types of devices: (i) devices located inside the stadium (e.g., devices of users that view the sporting event live), (ii) devices located outside the stadium in some type of off-site commercial venue (e.g., a venue that allows spectators to view live sports broadcasts), and (iii) devices located in residential property (e.g., a user's home).

Each type of device can also display different broadcasting formats (e.g., the cable broadcast 132a, the virtual reality broadcast 132b, or the mixed reality/augmented reality 132c as illustrated in FIG. 1A). For example, the scoreboard 330a can display video footage captured by a video camera that also captures video footage for the cable broadcast 132a. In addition, the device 330b can display an augmented reality or mixed reality broadcast that enables a spectator to view computer-generated graphics placed on real-world objects that are located within the area 302. The remote devices 330c and 330d can display cable broadcasts through their display devices and/or virtual reality broadcasts through associated an associated head-mounted device.

As described above, the smart device 120 can access, process, manage, and broadcast sensor data collected by the one or more performance measuring devices 110 in a manner similar to the techniques described above with respect to FIGS. 1A and 1B. The collected sensor data generally includes real-time motion data (e.g., sensor data measured by the accelerometer 116a, the gyroscope 116b, or the magnetometer 116c) or positional information of associated athletes on the area 302. In some implementations, the smart device 120 is a local device housed within the stadium as illustrated in the figure. In such implementations, the collected sensor data from the one or more performance measuring devices 110 is obtained, processed, and stored over a local network for security purposes. For example, the collected sensor data may be prevented from being transmitted over a wide area network (WAN) to a remote server to prevent unauthorized access to the collected sensor data. In other implementations where security surrounding the collected sensor data is not a significant concern, however, the smart device 120 may be remotely located from the stadium (e.g., in a remote web or application server).

The smart device 120 can be associated with a mobile application 122 that is accessible on the local device 330b and the remote devices 330c and 330d. The mobile application 122 may be a native application that enables the local device 330b and the remote devices 330c and 330d to view a broadcast of the sporting event. In some instances, display configurations generated by the smart device 120 in response to processing sensor data collected by the one or more performance measuring devices 110, as described above, are provided through the mobile application 122. For example, users of the remote devices 330c and 330d may use the mobile application 122 to stream a live broadcast of the sporting event. During the live broadcasts, the smart device 120 may transmit dynamically generated display configurations to adjust the display of the broadcast through the mobile application 122 as depicted in FIG. 1B. As described above, in other implementations, the smart device 120 provides the display configuration data to a producer system (e.g., a broadcasting station or a sports team system) which then adjusts the broadcast that is provided for output on the devices 330a, 330b, 330c, and 330d. In other implementations, the smart device 120 itself receives the broadcast and adjusts the broadcast using the display configuration data, and then transmits adjusted broadcast for output to the devices 330a, 330b, and 330d.

The administrator system 310 can be a remote server that is capable of accessing broadcast information transmitted by the smart devices 120 to the output devices that receive a broadcast of the sporting event (e.g., the scoreboard 330a, the local device 330b, the remote devices 330c and 330d). For instance, the administrator system 310 may provide support services to an end-user associated the output devices, or perform routine maintenance associated with mobile applications on the smart device 120. For example, a system administrator may use the administrator system 310 to access an HTTP frontend of the smart device 120 using a virtual public network (VPN) tunnel 126. The system administrator can also use a secure shell (SSH) connection to provide maintenance and upgrade services to a production virtual machine 124 running on the smart device 120. For example, the maintenance and upgrade services can include providing firmware and software updates, or performing routine maintenance on the mobile application 122.

In some implementations, the broadcasts provided to the remote devices 330c and 330d can be provided as virtual reality broadcasts (e.g., the virtual reality broadcast 132b as depicted in FIG. 1A). In such implementations, the remote devices 330c and 330d can be associated with a head-mounted device that enables a user to view a stereographic video feed that includes a broadcast of the sporting event and is responsive to head movements detected by the head-mounted unit or the devices 330c and 300d. As an example, a virtual reality broadcast may include video footage captured by a 360-degree camera that is placed courtside nearby the area 302. In addition, position information collected by the one or more performance measuring devices 110 can then be used to track the spatial positons of athletes within the 360-degree virtual reality feed. In some instances, the tracked positions can be associated with individual athletes such that when a user directs a gaze direction to a region within the 360-degree virtual feed that is associated with an athlete, information associated with the athlete can be dynamically provided for output to the user.

The customer network 220 can additionally include a virtual reality module that is capable of receiving athletic performance data from the athletic telemetry device 222 and providing a display of information that is adjusted for virtual reality. For instance, the adjusted display can include graphical overlays that are based on characteristics included within the athletic performance data such as speed, vertical height, intensity, etc. For example, a fire graphic can be displayed based on a high surge measurement. In other instances, measurements such as speed, vertical height, intensity can be used to configure graphic overlays associated with advertisers and sponsors based on a type of event indicated by the measurements. For example, if the type of event is associated with soda advertisers, then the graphical overlays can include players turning into an associated product after an event milestone such as a touchdown.

Referring now to FIG. 3B, the system 300B enables a producer to customize a broadcast of a sporting event that is provided for output. In general, the system 300B operates similarly to the system 300A described above except that the broadcasts that are provided to output devices are initially configured and/or customized by a producer on a producer system 340. The producer can use a configuration interface 342 to configure various configurations for the broadcast.

For example, the producer can use an option 342A to select default content 342 to provide for output on the broadcast, an option 342B to select the types of visible data and/or information (e.g., game milestones, information for selected athletes, player statistics, team statistics, etc.), an option 342C to insert textual content into a display of a current broadcast, or an option 342D to insert graphical content into a display of the current broadcast. In addition, the producer can make selections on the configuration 342 and the system 300B can process the selections and adjust the broadcast in real-time. In this regard, the producer can dynamically adjust a broadcast during the sporting event with a greater degree of control compared to other broadcasting systems where broadcast interfaces are pre-configured at the start of a broadcasting event.

The producer may be a network entity of an organization that manages the producer system 340 to obtain, maintain, and broadcast the collected sensor data by the one or more performance measuring devices 110. The producer can either be a content provider associated with the sports broadcast (e.g., a team owner or manager for a team that plays in the sporting event), or a third party content provider that originates the live broadcast feed (e.g., a television broadcasting company that provides media coverage of the sporting event). For example, in some implementations, the producer system 340 can be a server operated by a sports team manager that hosts a sporting event. In such instances, the smart device 120 may include an API module that specifies a set of instructions to the production system 340 to specify various options to a producer to customize a broadcast using the configuration interface 342. The producer can then use the configuration interface 342 to adjust the display of information during the sporting event (e.g., specific athletic performance parameters), or adjust configuration settings for displaying athletic performance parameters (e.g., fonts, graphical illustrations, frequency of updating displayed athletic performance parameters, etc.). In each of these examples, the display information can be stored in a producer data file whereas the content to display can be stored in a producer database.

Alternatively, in other implementations, the producer system 340 can also be a server operated by a third party content provider such as a television broadcasting company. In such implementations, individuals associated with the television broadcasting company, and not the producers associated with the sporting event, can use the configuration interface 342 to adjust the broadcast of the sporting event in a manner similar to the adjustment techniques described above. Referring now to the process illustrated in FIG. 3B, the smart device 120 initially obtains sensor data collected by the one or more performance measuring devices 110, and then process the obtained sensor data in a manner similar to the techniques described above with respect to FIG. 3A. However, instead of generating a display configuration to automatically configure and/or adjust the broadcast, the smart device 120 instead prepares a set of manual customization options that are then transmitted to the producer system 340 and made available to the producer on the configuration interface 342. The producer then selects configuration options for the broadcast on the configuration interface 342, which are then transmitted to the smart device 120. The smart device 120 then generates a display configuration based on the selections made by the producer on the configuration interface 342. The smart device 120 finally transmits the generated display configuration to various output devices in a manner similar to the techniques described above with respect to FIG. 3A. The broadcast that is then provided for output on the output devices is adjusted based on the selections made by the producer.

Referring now to FIG. 3C, the system 300C generally includes a local module 350 that temporarily stores athletic performance data when a smart device 320 has limited network connectivity. In the example depicted, the smart device 320 initially obtains athletic performance data from one or more performance measuring devices (e.g., the one or more performance measuring devices 110 illustrated in FIGS. 3A-3B). In addition, in this example, the smart device 320 is a portable electronic device instead of a stationary server system as described above with respect to the smart device 120 in the figures above.

In general, the system 300C can be used where there are potential security concerns for uploading collected sensor data over an unsecure network connection. The system 300C can also be used where access to a secured network connection is limited because, for example, a sports team is traveling on the road for extended periods of time. In such instances, instead of directly uploading collected sensor data onto a web server, the collected sensor data is instead temporarily uploaded to a local module 350, which maintains the temporarily uploaded sensor data in a local database 352. Once a secure network connection becomes available (e.g., when a sports team returns to their home stadium after a road trip), the data stored within the local database 352 can then be securely uploaded onto a cloud server through a secure network 307. In this regard, the system 300C enables a sports team to securely upload athletic performance data without compromising the amount of data to be collected.

In the example depicted in the figure, a user may use a mobile application 322 to upload sensor data obtained by the smart device 320 from one or more performance measuring devices. The user initially uses the mobile application 322 to select a player of interest from all players on a particular team. The user then views all athletic performance data that have been recently collected for the selected player. In the example, the mobile application 322 displays jump statistics for the selected player from a recent basketball game on Dec. 31, 2016. The collected athletic performance data for the selected athlete includes two athletic performance parameters (e.g., number of jumps, and maximum jump height) for each quarter of the game. The user can then use the mobile application 3222 to perform various management actions for the collected data. For example, the user can specify time points of the game to focus on, and specific actions to performed for the game.

Once the user has selected the data to temporarily store, the local module 350 then stores the selected data on the local database 352. In addition, live updates relating to data on the smart device 320 on the local module 350 can be periodically provided on an on-site display page 354 of the local module 350. In such instances, a user that uses the local module 350 to manage the uploaded data can receive notifications on recent uploads from the smart device 320, or newly obtained athletic performance data that still needs to be uploaded onto the local module 350. The live updates may also include notifications indicating when a secure network connection has become available so that the data stored in the local database 352 can be uploaded onto the secure network 307, or notification relating to recent uploads over the secure network 307.

Figure 4A:
FIGS. 4A-4B are diagrams that illustrate examples of user interfaces.
Figure 4B:
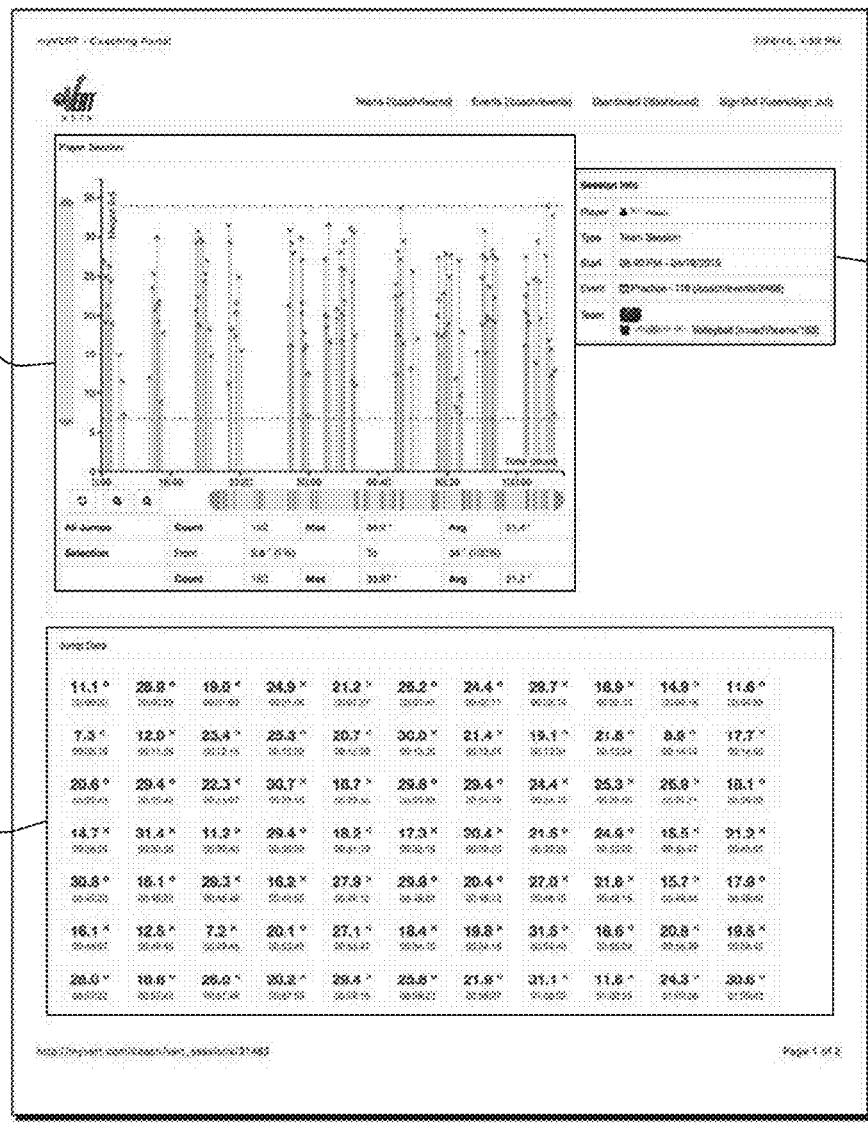

FIGS. 4A-4B are diagrams that illustrate examples of user interfaces 400A and 400B, respectively, which display athletic performance data. Referring initially to FIG. 4A, the interface 400A can be a user interface that is presented in a mobile application associated with the performance measuring devices 110a-j and the smart device 120. In The mobile application can be an application that runs on the smart device 120, an application that runs on output devices that receive broadcasts of a sporting event (e.g., the devices 330b, 330c, and 330c in FIG. 3A), or both.

In the example depicted in FIG. 4A, the interface 400A displays measurements 410 representing an average total acceleration over a particular period of time. The interface 400A also displays a measurement 420 representing a total number (or "total count") of total acceleration measurements collected by a performance measuring device over a particular period of time. The interface 400A also classifies each of these measurements into two categories, a category 430a representing high surge measurements, and a category 430b representing low surge measurements. In the example illustrated, the number of low surge measurements (e.g., 1,049 counts) almost doubles the number of high surge measurements (e.g., 536 counts). In this example, the surge measurements indicate that the measured changes in total acceleration over the particular period of time was relatively small, which is why the number of low surge counts exceeds the number of high surge counts.

The interface 400A also displays data visualization 440 that graphically represents the measurement 420 over a particular period of time. In the visualization 440, each line represents a single measurement (or a single count) and the vertical length of each line represents a measured magnitude of total acceleration at a time point associated with the measurement. As shown in the example, the change in total acceleration follows a consistent pattern over the time period, indicating regularly repeated physical activity being performed by an athlete.

Referring now to FIG. 4B, the interface 400B is a user interface that allows a user such as a coach or a team manager to monitor athletic performance based on real-time motion data collected by performance measuring devices (e.g., the performance measuring device 110 illustrated in FIG. 2). The interface 400B can either be accessed via a web page (e.g., an online coaching portal) or through an application that is associated with the athletic performance unit and/or the smart device 120.

The interface 400B includes player session data 450, which provides visualizations and calculated statistics for athletic performance parameters that the smart device 120 computes during a particular session. A session can refer either to a training session where the performance measuring devices are used to track athletic performance and development, or from a sporting event where the performance measuring devices can be used both for broadcasting purposes as described above in FIGS. 1A-1B and 3A-3B, training and monitoring purposes, or both.

In the example illustrated, the player session data 450 includes a number of jumps that were detected for a player during the player session, and for each detected jump, a corresponding jump height and detection timestamp (as shown in raw jump data 470). This data is used to generate a visualization that represents jump detection as a function of time. In the graph, the height of a line represents a jump height associated with a detected jump. The player session data 450 also includes a set of calculated statistics based on the computed athletic performance data (e.g., count, max jump height, average jump height).

The player session data 450 also enables a user to select a range of detected jumps and view statistics and/or data that falls within the selected range. In this regard, the user can select a range of interest that coincides with a particular athletic target and analyze the athletic performance data within the range of interest. In this regard, the player session data 450 enables a user to not only analyze retrospective data, but also recognize trends for prospective training purposes.

The session information 460 includes identifying information associated with the session during which athletic performance data was collected by an athletic performance unit. As shown, the session information 460 includes a player/athlete whose activity was monitored by the performance monitoring unit, a session type (e.g., team session, individual session, etc.), a session start time, an event name, and a team associated with the event session.

In some implementations, the interface 400B can alternatively display athletic information for a team of individuals as opposed to a single individual as depicted in FIG. 4B. In such implementations, individual data can be aggregated and correlated against averaged team data to compute performance metrics that compare individual and team performance based on the athletic performance data.

Figure 5A:
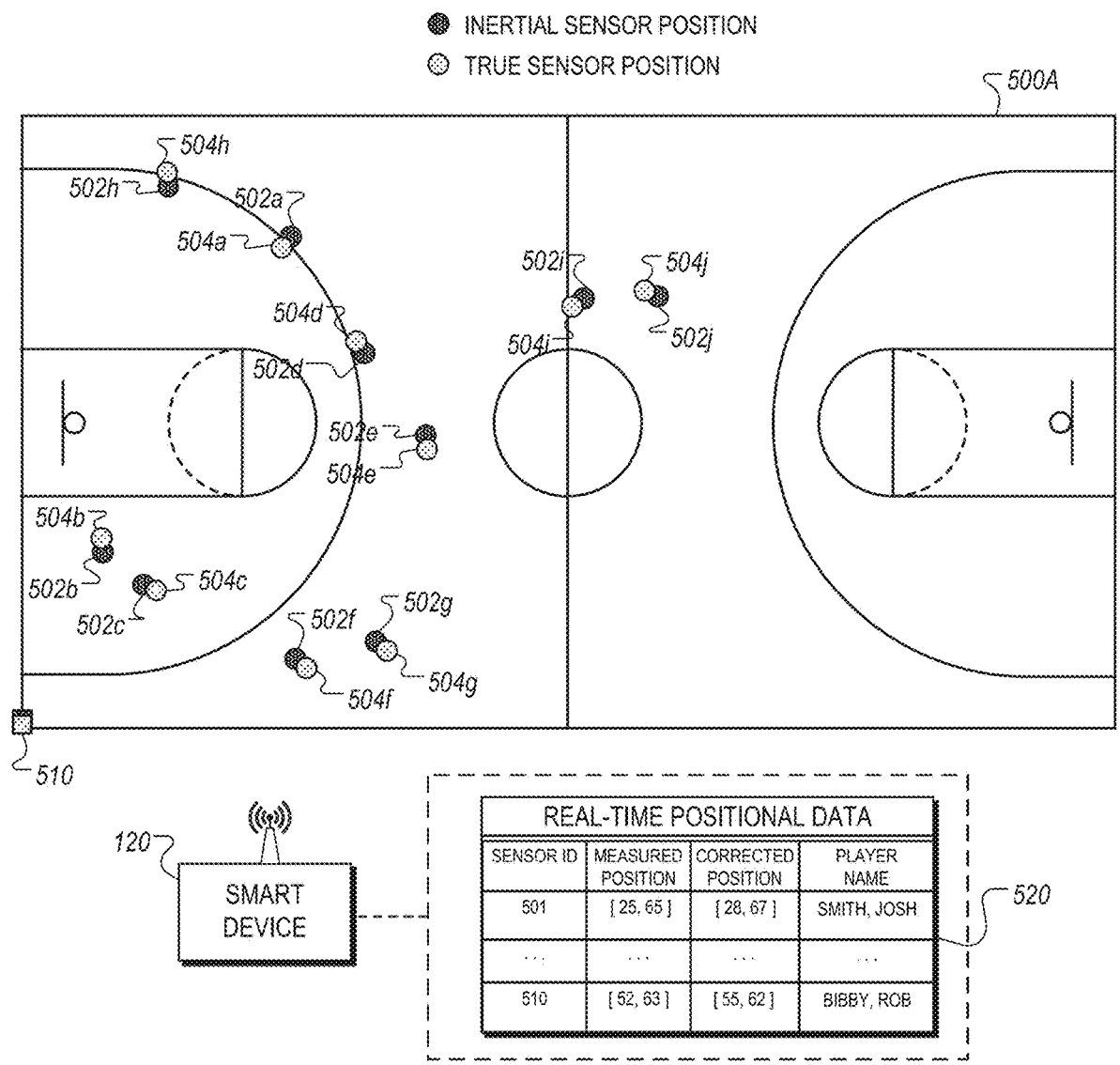
FIGS. 5A-5B are diagrams that illustrate schematic representations of a multi-lateration technique used to reduce average inertial positioning errors within a sensor network.
Figure 5B:
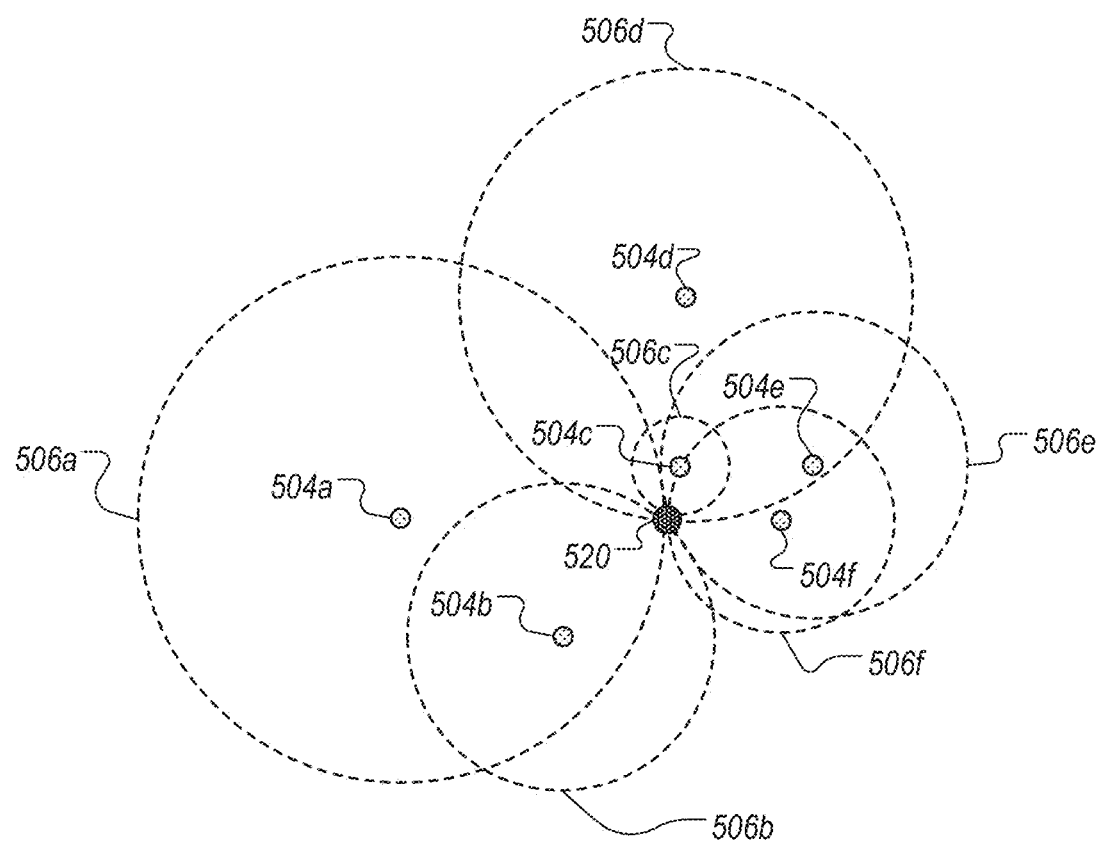

FIGS. 5A-5B are diagrams that illustrates concepts of a multi-lateration technique used to reduce average inertial positioning errors within a network of performance measuring devices. In general, the multi-lateration technique is used to reduce positioning errors of the performance measuring devices during, for example, a sporting event as illustrated in FIGS. 1A-1B and 3A-3B.

This technique is performed throughout a monitoring session because each performance measuring device determines its instantaneous position relative to its previous position. Therefore, after an initial position registration using a reference location or sensor, each performance measuring device determines its subsequent position based on a previously determined position and detected motion data during a time interval between simultaneous position measurements. Therefore, as the number of position measurements increases, positional errors due to propagation increases, making each subsequent position estimation less accurate.

The multi-lateration technique reduces potential positioning errors due to propagation by correcting an estimated position with a true position each time an athletic performance estimates a position. The true position is determined based on multiple estimates of position in space using different types of signals. Each of these estimations can be referred to as multiple versions of the "truth"—that is an actual sensor position. Position estimates are obtained from different types of sensor data collected by sensors included within a performance measuring device (e.g., wireless signal strength, accelerometer data, magnetometer data, gyroscope data), the multiple position estimates are then aggregated to identify a true (or actual) position. In some implementations, environmental data may also be obtained to identify a true position. Examples of such environmental data include, for example, data obtained from wireless beacons, body-mesh sensors, infrared sensors. In other implementations, mesh sensor networks can be used locally or remotely to compute the true position.

In some implementations, the available estimates of the truth may be organized as a set of linear equations, with more equations than unknown variables. The evolution of the input estimates over time may also be used to refine the output estimate. Methods known to those skilled in the art, such as the Ordinary Least Squares (OLS) method, may then be used to determine the most probable physical arrangement of the ensemble of sensors, which in some implementations might be the arrangement with the minimal resulting sum of the squared error that would consequently be assumed to be present in each contributing estimation of the truth.

Other implementations may use a Kalman filter where the previous estimate of the underlying system state variables is used to predict their state at the next iteration, given the physics at play in the system (i.e. the laws of motion), as well as the statistical uncertainty associated with each state variable. This prediction is then compared to the next batch of noisy measurements, and the estimate of the underlying state variables is updated using a weighted average, where more weight is given to estimates with higher certainties, thus incorporating feedback into the system, whereby some measurements can be trusted more than others for that iteration of the estimator.

The multi-lateration technique described above is performed for each individual athletic performance device that is located in an area 500A such as a field where a sporting event takes place. In the example depicted in the figure, the multi-lateration technique is performed to adjust an inertial sensor position (e.g., a position determined based solely on inertial movements), which is likely to be prone to propagation errors discussed above, to a maximally probable estimate of the true sensor position. For example, inertial sensor positions 502*a-j* represent estimated positions without the use of the multi-lateration technique, and the true sensor positions 504*a-j* represent respective positions corresponding to the inertial sensor positions 502*a-j* that are identified based on the use of the multi-lateration technique.

Once the true sensor positions 504*a-j* are determined for each of the athletic performance units within the area 500A, the smart device 120 is capable of identifying a relative spatial arrangement between the athletic performance units. For example, the smart device 120 can use the true sensor positions to determine the distance between each performance measuring device, and for each performance measuring device, a direction of nearby athletic performance devices. In some implementations, the multi-lateration technique alone, does not enable the smart device 120 to identify the spatial position within the area 500A that corresponds to each athletic performance unit. To determine this, the smart device 120 instead compares a known position of a reference sensor 510 in relation to the area 500A (e.g., bottom left corner) each of the respective true sensor positions 504*a-j* to determine a coordinate position of each athletic performance unit within the area 500A.

In other implementations true positions of sensors can be determined without a fixed reference point. In such implementations, contextual information such as the expectation that players must be roughly arranged in a plane that is parallel to the surface of the earth, and must be within 0 to 6 feet above the surface of the Earth (and never below it) can be used to determine the true positions of the sensors. Other examples of context data can be that the sensors are informed that the field of play is longer in the North-South axis than the East-West axis. These types of context data allow some potential solutions to be identified as non-physical, allowing the possible solution set to be reduced.

During the broadcasting of a sporting event, as described in FIGS. 1A-1B, and 3A-3B, the multi-lateration techniques described above can be used to obtain a sufficiently accurate real-time position information of each athlete that participates in the sporting event. For example, the smart device 120 tracks real-time positional data 520, which includes a sensor ID, a measured inertial position, a corrected position (e.g., true sensor position), and a player that is associated with each sensor. Therefore, the real-time positional data 520 enables the smart device 120 to identify, monitor, and track the respective locations of each athlete within the area 500A as the sporting event progresses. This positional information, can be combined with real-time motion data collected by the accelerometers, gyroscopes, and magnetometers to perform various broadcast augmentation techniques described above in connection with, for example, FIGS. 1A-1B.

FIG. 5B depicts a schematic representation of how the multi-lateration technique can be applied to a sensor network topology. For instance, in the example depicted in FIG. 5B, a relative range may be measured between a sensor node 520 with a known coordinate and a sensor node 504*a*. The relative range estimation technique can then be repeated for each of the sensor nodes 504*b*-504*f* to estimate sensor locations within a coordinate system. Although FIG. 5B depicts the sensor node 520 with a known coordinate location, in some instances, more than one sensor node can have fixed coordinate locations.

In some implementations, the multi-lateration technique can be applied to a traveling sensor network where none of the sensor nodes are at a geographically fixed location. In such implementations, the multi-lateration technique can be used to provide a relative position, as opposed to a true position as described above, that is based on the respective relative positions for each of the other sensor nodes within the traveling sensor network. In some implementations, the estimation of relative distances for the traveling sensor network may be based upon the time accuracy of the particular range estimation technique used.

As described above, the bias error can be calculated based on computing the difference between the relative distance measured using an inertial measurement and the relative distance measured using a non-inertial measurement. The true sensor position is determined based on combining the inertial measurements and the estimated bias error. For example, if the bias error indicates that the inertial measurement is larger than the non-inertial measurement, then the inertial measurement's contribution to the estimate of the true underlying system state may be reduced. An example of this approach may use a Kalman filter as previously described, wherein the previous estimate of the underlying system state variables is used to predict their state at the next iteration, given the physics at play in the system (i.e. the laws of motion), as well as the statistical uncertainty associated with each state variable. This prediction is then compared to the next batch of noisy measurements, and the estimate of the underlying state variables is updated using a weighted average, where more weight is given to estimates with higher certainties, thus incorporating feedback into the system, whereby some measurements can be trusted more than others for that iteration of the estimator.

In some implementations, the multi-lateration technique may include the use of deployable waypoint beacons at stationary locations with known coordinate locations. In such implementations, the waypoint beacons can be used as stationary anchor nodes within the sensor network that act to constraint inertial sensor bias calculations. For instance, the waypoint beacons can be deployed at a location where geographic position has been recently validated using GPS in order to fix the waypoint to a known location. Alternatively, the beacons can be known to simply be at the corners of an athletic field of play, or set distances from similar landmarks. Afterwards, the positions of each of the sensor nodes 504*a*-504*f* can be calculated using relative distances determined using the multi-lateral technique as described above.

Figure 6:
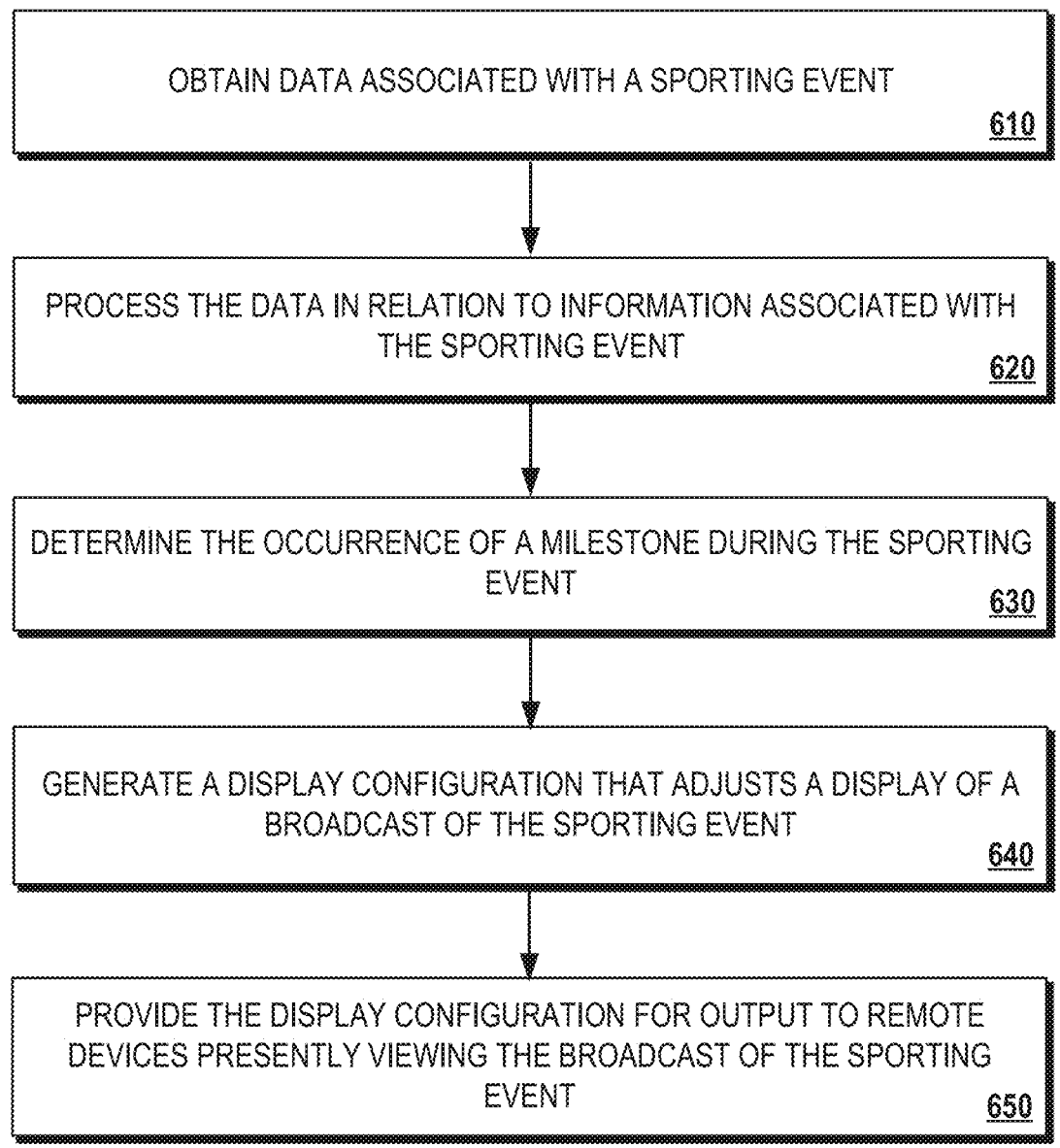
FIG. 6 is a flowchart that illustrates an example of a process for remotely broadcasting data associated with a sporting event.

FIG. 6 is a flowchart that illustrates an example of a process 600 for remotely broadcasting data associated with a sporting event. Briefly, the process 600 can include obtaining data associated with a sporting event (610), processing the data in relation to information associated with the sporting event (620), determining an occurrence of a milestone during the sporting event (630), generating a display configuration that adjusts a display of a broadcast of the sporting event (640), providing the display configuration for output to remote devices presently viewing the broadcast of the sporting event (650).

In more detail, the process 600 can include obtaining data associated with a sporting event (610). For instance, the smart device 120 may obtain real-time motion data 118 collected by the performance measuring device 110b that is associated with a that participates in the sporting event as shown in FIG. 1B. The real-time motion data can include a measured total acceleration, a movement direction, and/or a surge associated with the athlete's physical activity. In some implementations, for example in FIG. 1A, the real-time motion data can be obtained from multiple performance measuring devices such as the performance measuring devices 110a j.

The smart device 120 may also obtain information associated with the sporting event such as game progression information and/or sporting event information 119 as described above with respect to FIG. 1B. In addition, the smart device 120 may also obtain data identifying local or remote devices (e.g., scoreboard 330a, and devices 330b, 330c, and 330d illustrated in FIG. 3A) where a broadcast of the sporting event is presently being viewed by a user.

The process 600 can include processing the data in relation to information associated with the sporting event (620). For instance, the smart device 120 may process the real-time motion data 118 in relation to the sporting event information 119 as described above with respect to FIG. 1B.

The process 600 can include determining an occurrence of a milestone during the sporting event (630). As described above, a milestone can represent a specified event of interest relating to a sporting event. In the example illustrated in FIG. 1B, the smart device 120 determines that the athlete associated with the performance measuring unit 110k is about to perform a dunk during a basketball. This determination is based on, for example, the real-time motion data 118 (e.g., total acceleration, movement direction, amount of surge), spatial information collected by the performance measuring unit 110k, as well as the obtained sporting event information 119 (e.g., game progression information, historical and in-game athletic performance statistics, etc.). In this example, the milestone is determined based on a combination of the measured total acceleration satisfying a specified threshold, a detected direction of movement towards a basketball hook, and vertical jump height exceeding a threshold value.

The process 600 can include generating a display configuration that adjusts a display of a broadcast of the sporting event (640). For instance, in response to determining the occurrence of a milestone, the smart device 120 generates the display configuration 121 that adjusts a display of the broadcast 132 of the sporting event.

The process 600 can include providing the display configuration for output to remote devices presently viewing the broadcast of the sporting event (650). As discussed above, the smart device 120 can provide the display configuration 121 for output using various techniques. In some implementations, the smart device 120 actually obtains the broadcast of the sporting event either adjusts the broadcast of the sporting event based on the generated display configuration 121. The smart device 120 then provides the adjusted broadcast for output to the remote devices that are presently viewing the broadcast of the sporting event. In other implementations, instead of transmitting an adjusted broadcast, the smart device 120 instead transmits the display configuration 121 to the remote devices. A mobile application running on the remote devices then uses the display configuration to adjust a display of the broadcast. Each of these examples is illustrated in FIG. 3A.

In other implementations, the smart device 120 does not obtain the broadcast, but instead transmits the generated display configuration 121 to a third party (e.g., a broadcasting network or a producer). The third party entity can then manually adjust the broadcast by using an interface (e.g., the producer interface 342) to generate a customized broadcast of the sporting event. The customized broadcast can then be transmitted to the remote device through the smart device 120 or through another broadcasting device. These examples are illustrated in FIG. 3B.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by one or more computers, the method comprising:
obtaining, by a computing device and from a producer system, customization settings specified by a content provider for generating a display configuration for a broadcast of a sporting event;
obtaining, by the computing device, data identifying (i) real-time motion data of individuals during the sporting event, (ii) information associated with the sporting event comprising at least game progression data collected during the sporting event, and (iii) which of a plurality of remote devices are presently viewing the broadcast of the sporting event;
processing, by the computing device, the real-time motion data in relation to the game progression data collected during the sporting event, wherein the real-time motion data comprises:
a measured total acceleration for each of the individuals; and
a predicted position for each of the individuals within an area associated with the sporting event;
determining, by the computing device, an occurrence of a milestone during the sporting event based at least on processing the real-time motion data in relation to the game progression data collected during the sporting event;
in response to determining the occurrence of the milestone during the sporting event, generating, by the computing device, the display configuration that (i) adjusts the broadcast of the sporting event according to the customization settings specified by the content provider and (ii) comprises one or more graphical overlays that are provided for output on the broadcast in relation to the occurrence of the milestone, wherein generating the display configuration comprises:
identifying a particular individual from among the individuals that is determined to have a highest measured total acceleration;
selecting a graphical overlay to include in the display of the broadcast based on the highest measured total acceleration;
determining a time point to present the graphical overlay; and
determining a position of the graphical overlay within the display of the broadcast based on the predicted position of the particular individual within the area associated with the sporting event; and
providing, by the computing device, the display configuration for output to the remote devices presently viewing the broadcast of the sporting event.

2. The method of claim 1, wherein the information associated with the sporting event comprises advertisement data related to the sporting event.

3. The method of claim 1, wherein the occurrence of the milestone during the sporting event is based on determining that at least a portion of the real-time motion data, for a particular individual from among the individuals, satisfies a predetermined threshold.

4. The method of claim 1, wherein generating the display configuration comprises:
obtaining, from a producer system, data indicating a user selection of real-time content to be presented on the display of the broadcast; and
generating the display configuration based on the obtained data indicating the user selection of real-time content to be presented on the display of the broadcast.

5. The method of claim 1, wherein the display of the broadcast of the sporting event is a virtual reality broadcast.

6. The method of claim 1, wherein the display of the broadcast of the sporting event is an augmented reality broadcast.

7. The method of claim 1, wherein the customization settings specified by the content provider identifies a frequency for updating athletic performance parameters that are displayed in the broadcast of the sporting event.

8. The method of claim 1, wherein:
the content provider is a sports team manager that hosts the sporting event; and
the customization settings specified by the content provider comprise a selection of content that is (i) specified by the sports team manager through a configuration interface and (ii) to be included in the one or more graphical overlays.

9. The method of claim 1, wherein:
the content provider is a television broadcasting organization that provides the broadcast of the sporting event to the plurality of remote devices; and
the customization settings specified by the content provider comprise a selection of graphical illustrations that are (i) specified by the television broadcasting organization through a configuration interface and (ii) to be included in the one or more graphical overlays.

10. A system comprising:
one or more processors; and
one or more computer-readable media including instructions that, when executed by the one or more processors, cause performance of operations comprising:
obtaining, by a computing device and from a producer system, customization settings specified by a content provider for generating a display configuration for a broadcast of a sporting event;
obtaining, by the computing device, data identifying (i) real-time motion data of individuals during the sporting event, (ii) information associated with the sporting event comprising at least game progression data collected during the sporting event, and (iii) which of a plurality of remote devices are presently viewing the broadcast of the sporting event;
processing, by the computing device, the real-time motion data in relation to the game progression data collected during the sporting event, wherein the real-time motion data comprises:
a measured total acceleration for each of the individuals; and
a predicted position for each of the individuals within an area associated with the sporting event;
determining, by the computing device, an occurrence of a milestone during the sporting event based at least on processing the real-time motion data in relation to the game progression data collected during the sporting event;
in response to determining the occurrence of the milestone during the sporting event, generating, by the computing device, the display configuration that (i) adjusts the broadcast of the sporting event according to the customization settings specified by the content provider and (ii) comprises one or more graphical overlays that are provided for output on the broadcast in relation to the occurrence of the milestone, wherein generating the display configuration comprises:
identifying a particular individual from among the individuals that is determined to have a highest measured total acceleration;
selecting a graphical overlay to include in the display of the broadcast based on the highest measured total acceleration;
determining a time point to present the graphical overlay; and
determining a position of the graphical overlay within the display of the broadcast based on the predicted position of the particular individual within the area associated with the sporting event; and
providing, by the computing device, the display configuration for output to the remote devices presently viewing the broadcast of the sporting event.

11. The system of claim 10, wherein the information associated with the sporting event comprises advertisement data related to the sporting event.

12. The system of claim 10, wherein the occurrence of the milestone during the sporting event is based on determining that at least a portion of the real-time motion data, for a particular individual from among the individuals, satisfies a predetermined threshold.

13. One or more non-transitory computer-readable media having instructions stored thereon that, when executed by one or more processors, cause performance of operations comprising:
obtaining, by a computing device and from a producer system, customization settings specified by a content provider for generating a display configuration for a broadcast of a sporting event;
obtaining, by the computing device, data identifying (i) real-time motion data of individuals during the sporting event, (ii) information associated with the sporting event comprising at least game progression data collected during the sporting event, and (iii) which of a plurality of remote devices are presently viewing the broadcast of the sporting event;
processing, by the computing device, the real-time motion data in relation to the game progression data collected during the sporting event, wherein the real-time motion data comprises:
a measured total acceleration for each of the individuals; and
a predicted position for each of the individuals within an area associated with the sporting event;
determining, by the computing device, an occurrence of a milestone during the sporting event based at least on processing the real-time motion data in relation to the game progression data collected during the sporting event;
in response to determining the occurrence of the milestone during the sporting event, generating, by the computing device, the display configuration that (i) adjusts the broadcast of the sporting event according to the customization settings specified by the content provider and (ii) comprises one or more graphical overlays that are provided for output on the broadcast in relation to the occurrence of the milestone, wherein generating the display configuration comprises:
identifying a particular individual from among the individuals that is determined to have a highest measured total acceleration;
selecting a graphical overlay to include in the display of the broadcast based on the highest measured total acceleration;
determining a time point to present the graphical overlay; and
determining a position of the graphical overlay within the display of the broadcast based on the predicted position of the particular individual within the area associated with the sporting event; and
providing, by the computing device, the display configuration for output to the remote devices presently viewing the broadcast of the sporting event.

14. The one or more non-transitory computer-readable media of claim 13, wherein the information associated with the sporting event comprises advertisement data related to the sporting event.

* * * * *